United States Patent
Aitoh et al.

(10) Patent No.: US 10,801,932 B2
(45) Date of Patent: Oct. 13, 2020

(54) FRACTURE PREDICTION METHOD AND DEVICE, PROGRAM, AND RECORDING MEDIUM

(71) Applicant: NIPPON STEEL & SUMITOMO METAL CORPORATION, Tokyo (JP)

(72) Inventors: Takahiro Aitoh, Tokyo (JP); Toshiyuki Niwa, Tokyo (JP); Yoshiyuki Kaseda, Tokyo (JP); Nobuyuki Maniwa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 173 days.

(21) Appl. No.: 16/073,272

(22) PCT Filed: Feb. 3, 2017

(86) PCT No.: PCT/JP2017/004047
§ 371 (c)(1),
(2) Date: Jul. 26, 2018

(87) PCT Pub. No.: WO2017/135432
PCT Pub. Date: Aug. 10, 2017

(65) Prior Publication Data
US 2019/0064040 A1 Feb. 28, 2019

(30) Foreign Application Priority Data

Feb. 5, 2016 (JP) .................................. 2016-021170
Feb. 10, 2016 (JP) .................................. 2016-023823

(51) Int. Cl.
*G01N 3/00* (2006.01)
*G01N 3/06* (2006.01)
(Continued)

(52) U.S. Cl.
CPC .............. *G01N 3/066* (2013.01); *B23K 11/11* (2013.01); *G01N 3/08* (2013.01); *G01N 3/20* (2013.01);
(Continued)

(58) Field of Classification Search
CPC .......... G01N 3/0666; G01N 3/08; G01N 3/20; G01N 2203/0017; G01N 2203/0296;
(Continued)

(56) References Cited

U.S. PATENT DOCUMENTS 5,317,925 A * 6/1994 Hayashi ................... G01N 3/08
422/53
5,378,429 A * 1/1995 Hayashi ................... G01N 3/20
422/53
(Continued)

FOREIGN PATENT DOCUMENTS

EP       2 543 982 A1    1/2013
JP       2005-148053 A   6/2005
(Continued)

OTHER PUBLICATIONS

Extended European Search Report for European Application No. 17747583.7, dated Sep. 18, 2019.
(Continued)

*Primary Examiner* — Max H Noori
(74) *Attorney, Agent, or Firm* — Birch, Stewart, Kolasch & Birch, LLP

(57) ABSTRACT

In a deformation simulation of a member joined by spot welding, an effective width being a width in a direction intersecting a direction of a load centered on a spot welded portion (14) on a flange face (13a) where the spot welded portion (14) is provided of a member (10) and changing correspondingly to a change in the load is calculated every predetermined time interval, and fracture of the spot welded
(Continued)

portion (14) is predicted using the calculated effective width. This configuration enables precise fracture prediction of a spot welded portion where spot welding is modeled, for example, in a case of performing collision deformation prediction of an automobile member on a computer.

21 Claims, 19 Drawing Sheets

(51) Int. Cl.
    *B23K 11/11*     (2006.01)
    *G01N 3/08*     (2006.01)
    *G06F 30/15*     (2020.01)
    *G06F 30/23*     (2020.01)
    *G01N 3/20*     (2006.01)
    *G06F 113/24*     (2020.01)

(52) U.S. Cl.
    CPC .............. *G06F 30/15* (2020.01); *G06F 30/23* (2020.01); *G01N 2203/0017* (2013.01); *G01N 2203/0296* (2013.01); *G06F 2113/24* (2020.01)

(58) Field of Classification Search
    CPC ...... G06F 30/23; G06F 30/15; G06F 2113/24; B23K 11/11
    USPC ............................................................ 73/799
    See application file for complete search history.

(56) References Cited

U.S. PATENT DOCUMENTS

| | | | | |
|---|---|---|---|---|
| 10,549,388 | B2* | 2/2020 | Fujimoto | B23K 11/115 |
| 2005/0132809 | A1* | 6/2005 | Fleming | G01N 3/00 |
| | | | | 73/597 |
| 2007/0090165 | A1* | 4/2007 | Kumagai | B23K 31/12 |
| | | | | 228/101 |
| 2007/0199924 | A1 | 8/2007 | Yoshida et al. | |
| 2015/0330881 | A1 | 11/2015 | Niwa et al. | |
| 2018/0079026 | A1* | 3/2018 | Miyazaki | B23K 11/16 |
| 2018/0257165 | A1* | 9/2018 | Sawanishi | B23K 11/115 |

FOREIGN PATENT DOCUMENTS

| | | |
|---|---|---|
| JP | 2005 315854 A | 11/2005 |
| JP | 2005-326401 A | 11/2005 |
| JP | 2007-212416 A | 8/2007 |
| JP | 2007-304005 A | 11/2007 |
| JP | 2008-102041 A | 11/2007 |
| JP | 4133956 B2 | 8/2008 |
| JP | 4150383 B2 | 9/2008 |
| JP | 4418384 B2 | 2/2010 |
| JP | 4700559 B2 | 6/2011 |
| JP | 5370456 B2 | 6/2011 |
| JP | 2013-83562 A | 5/2013 |
| KR | 10-2015-0084960 A | 7/2015 |

OTHER PUBLICATIONS

International Search Report for PCT/JP2017/004047 (PCT/ISA/210) dated Apr. 11, 2017.
Written Opinion of the International Searching Authority for PCT/JP2017/004047 (PCT/ISA/237) dated Apr. 11, 2017.
Notification of Transmittal of Translation of the International Preliminary Report on Patentability; International Preliminary Report on Patentability, issued in PCT/JP2017/004047, dated Aug. 16, 2018 (PCT/IB/338 and PCT/IB/373).
Korean Office Action, dated Mar. 25, 2020, for Korean Appiication No. 10-2010-7022307, with English Machine translation.

\* cited by examiner

FIG. 10

HAT MEMBER WITH SHEET THICKNESS OF 1.6mm

N: NO SPOT FRACTURE  F: SPOT FRACTURE OCCURRED
O: PREDICTION HIT  ×: PREDICTION FAILED

| SPOT POSITION | EXPERIMENTAL RESULT | | FEM ANALYSIS PREDICTION RESULT | | | | | | |
|---|---|---|---|---|---|---|---|---|---|
| | | | FIRST EMBODIMENT | | PRIOR ART 1 (EFFECTIVE WIDTH FIXED TO SPOT INTERVAL) | | PRIOR ART 2 (EFFECTIVE WIDTH FIXED TO FLANGE WIDTH) | | |
| | A ROW | B ROW | A ROW | B ROW | A ROW | B ROW | A ROW | B ROW | |
| 1~10 | N | N | N O | N O | N O | N O | N O | N O | |
| 11 | N | N | N O | N O | N O | F × | N O | N O | |
| 12 | N | N | N O | N O | F × | F × | N O | N O | |
| 13 | N | N | N O | N O | F × | F × | N O | N O | |
| 14 | F | N | F O | N O | F × | F × | F × | N O | |
| 15 | N | F | N O | F O | F O | F O | F × | N O | |
| 16 | F | N | F O | N O | F O | N O | F × | F O | |
| 17 | N | N | N O | N O | F × | F × | F × | N O | |
| 18 | F | N | N O | N O | N O | N O | F O | N O | |
| 19 | N | N | N O | N O | N O | N O | F × | F O | |
| 20 | N | N | N O | N O | N O | N O | N O | F × | |
| 21 | N | N | N O | N O | N O | N O | N O | N O | |
| 22 | N | N | N O | N O | N O | N O | N O | N O | |
| 23 | N | N | N O | N O | N O | N O | N O | N O | |
| 24~33 | N | N | N O | N O | N O | N O | N O | N O | |
| HITTING RATIO OF PRESENCE OR ABSENCE OF OCCURRENCE OF FRACTURE AT EACH SPOT WELDING POSITION | | | 100% (66/66) | | 80.3% (53/66) | | 90.9% (60/66) | | |

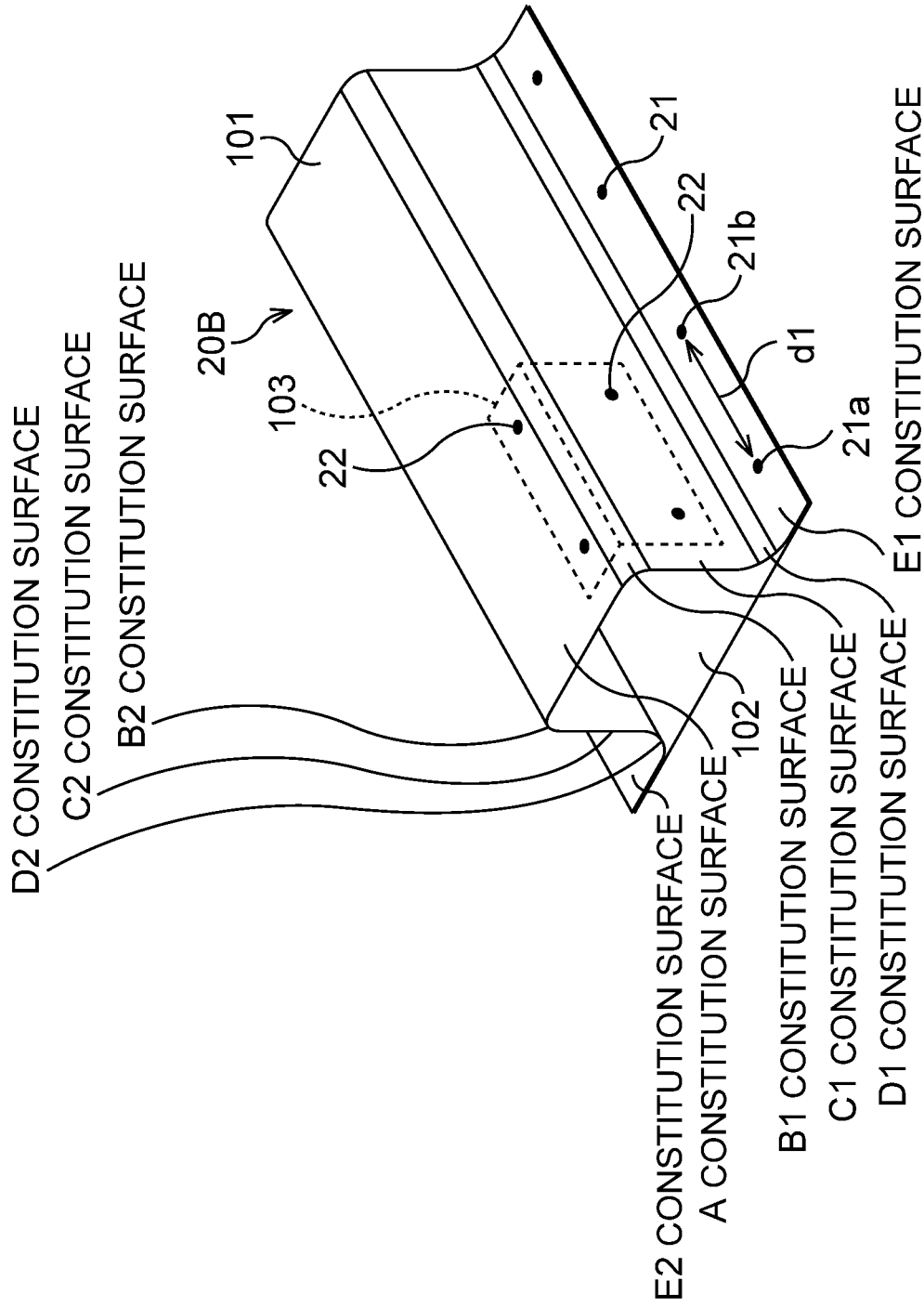

FIG. 19

HAT MEMBER WITH REINFORCING SHEET (SHEET THICKNESS OF 1.6mm)

N: NO SPOT FRACTURE  F: SPOT FRACTURE OCCURRED
O: PREDICTION HIT  x: PREDICTION FAILED

| POINT POSITION | EXPERIMENTAL RESULT | | FEM ANALYSIS PREDICTION RESULT | | | | | | |
|---|---|---|---|---|---|---|---|---|---|
| | | | SECOND EMBODIMENT ①VARY EFFECTIVE WIDTH ACCORDING TO LOAD DIRECTION ②ACQUIRE EFFECTIVE WIDTH ACCORDING TO CONSTITUTION SURFACE | | FIRST EMBODIMENT ①VARY EFFECTIVE WIDTH ACCORDING TO LOAD DIRECTION | | PRIOR ART (EFFECTIVE WIDTH FIXED TO SPOT INTERVAL) | |
| | A ROW | B ROW | A ROW | B ROW | A ROW | B ROW | A ROW | B ROW |
| 1~10 | N | N | N O | N O | N O | N O | N O | N O |
| 11 | N | N | N O | N O | N O | N O | N O | F x |
| 12 | N | N | N O | N O | N O | N O | F x | F x |
| 13 | N | N | N O | N O | F x | N O | F x | F x |
| 14 | N | N | F O | F O | F O | F O | F x | F x |
| 15 | F | F | F O | F O | F O | F O | F O | F O |
| 16 | F | F | F O | F O | F O | F O | F O | F O |
| 17 | F | F | F O | F O | F O | F O | F O | F O |
| 18 | N | N | N O | N O | N O | F x | F x | F x |
| 19 | N | N | N O | N O | N O | N O | F x | F x |
| 20 | N | N | N O | N O | N O | N O | F x | F x |
| 21 | N | N | N O | N O | N O | N O | F x | F x |
| 22 | N | N | N O | N O | N O | N O | F x | F x |
| 23 | N | N | N O | N O | N O | N O | N O | N O |
| 24~33 | N | N | N O | N O | N O | N O | N O | N O |
| HITTING RATIO OF PRESENCE OR ABSENCE OF OCCURRENCE OF FRACTURE AT EACH SPOT WELDING POSITION | | | 100% (66/66) | | 92.4% (61/66) | | 77.2% (51/66) | |

FRACTURE PREDICTION METHOD AND DEVICE, PROGRAM, AND RECORDING MEDIUM

TECHNICAL FIELD

The present invention relates to a fracture prediction method and device, a program and a recording medium.

BACKGROUND ART

In recent years, development of a vehicle body structure capable of reducing impact at collision is an urgent issue in the automobile industry. In this case, it is important to cause a structural member of an automobile to absorb impact energy. A main configuration for absorbing the impact energy at collision of the automobile is a structure that the member is molded by press forming or the like and then the member is made to have a closed cross section by spot welding. A spot welded portion needs to secure the strength capable of maintaining the closed cross section of the member without easy fracture even in a complicated deformation state at collision and under a load condition.

CITATION LIST

Patent Literature

Patent Literature 1: Japanese Patent No. 4150383
Patent Literature 2: Japanese Patent No. 4133956
Patent Literature 3: Japanese Patent No. 4700559
Patent Literature 4: Japanese Patent No. 4418384
Patent Literature 5: Japanese Patent No. 5370456

SUMMARY OF INVENTION

Technical Problem

As a method of measuring the fracture strength of the spot welded portion, a tensile test is employed which uses a test piece of a shear joint type, a cross joint type, or an L-shape joint type. The shear joint type test is a test of measuring the strength in the case where shear force is mainly applied to the test piece to lead to fracture, the cross joint type test is a test of measuring the strength in the case where axial force is mainly applied to the test piece to lead to fracture, and the L-shape joint type test is a test of measuring the strength in the case where moment is mainly applied to the test piece to lead to fracture. In Patent Literatures 1 to 4, methods of predicting fracture of the spot welded portion in respective input modes are discussed. More specifically, there is proposed a method of predicting the fracture strength of the spot welded portion in consideration of the influence of the structure such as the width (hereinafter, called an effective width) of a flat surface of the spot welded portion receiving the input load in the member. As the effective width, a width of a flat surface of the spot welded portion receiving the input load in a direction intersecting an input load direction, for example, a flange width or an interval between adjacent spots is selected, for example, in a hat member formed by a plurality of spot welded portions. In the case of the hat member, fixed values of the effective width, a material strength, a sheet thickness, a nugget diameter and so on are supplied as prediction condition values to fracture strength prediction.

However, in the case of considering collision deformation in a full vehicle model of the automobile, for example, various input loads are applied to the member which is complicatedly deformed. The direction of the input load is considered to change in the middle of deformation of the member. FIG. 1 is a characteristic chart illustrating a relation between a ratio (d/W) between a nugget diameter d of the member and an effective width W, and, a stress concentration coefficient $\alpha$. The stress concentration coefficient $\alpha$ is a value inversely proportional to a fracture limit load (load reaching fracture criteria) of the spot welded portion, and is an index for evaluating the fracture limit load. As described above, in the case of considering the collision deformation of the automobile, the direction of the input load is considered to change in the middle of deformation of the member, and the value of the effective width is considered to also change accompanying the change. Since the nugget diameter d is substantially constant, the stress concentration coefficient $\alpha$ changes as illustrated accompanying the change in value of the effective width. In short, the fracture limit load changes. Therefore, when the fracture limit load is found with the effective width being a fixed value and prediction is performed on the member that changes in the direction of the input load in the middle of deformation, the predicted fracture limit load deviates at timing when the direction of the input load changes, resulting in difficulty in performing precise fracture prediction.

The present invention has been made in consideration of the above problem, and its object is to provide a fracture prediction method and device, a program and a recording medium, capable of performing, precisely and with high accuracy, fracture prediction of a spot welded portion where spot welding is modeled, for example, in a case of performing collision deformation prediction of an automobile member on a computer.

Solution to Problem

A fracture prediction method of the present invention is a fracture prediction method of a spot welded portion of a member joined by spot welding in a case where a load is applied to the spot welded portion to lead to fracture. Concretely, the fracture prediction method includes: acquiring an effective width in a direction including the spot welded portion and intersecting a direction of the load on a flat surface where the spot welded portion of the member is provided; calculating, every predetermined time interval, the effective width changing correspondingly to a change in the load; and predicting fracture of the spot welded portion using the calculated effective width.

A fracture prediction device of the present invention is a fracture prediction device of a spot welded portion of a member joined by spot welding in a case where a load is applied to the spot welded portion to lead to fracture. Concretely, the fracture prediction device includes: a calculator that calculates, every predetermined time interval, an effective width in a direction including the spot welded portion and intersecting a direction of the load on a flat surface where the spot welded portion of the member is provided and changing correspondingly to a change in the load; and a predictor that predicts fracture of the spot welded portion using the effective width.

A program product of the present invention is a program product of predicting fracture of a spot welded portion of a member joined by spot welding in a case where a load is applied to the spot welded portion to lead to fracture. Concretely, the program product causes a computer to execute: a first process of calculating, every predetermined time interval, an effective width in a direction including the spot welded portion and intersecting a direction of the load on a flat surface where the spot welded portion of the member is provided and changing correspondingly to a change in the load; and a second process of predicting fracture of the spot welded portion using the effective width.

Advantageous Effects of Invention

According to the present invention, it is possible to perform, with high accuracy, fracture prediction of a spot welded portion where spot welding is modeled, for example, in a case of performing collision deformation prediction of an automobile member on a computer.

BRIEF DESCRIPTION OF DRAWINGS

FIG. 10 is a table illustrating results of summarizing presence or absence of occurrence of fracture of each spot welded portion after the three-point bending test in the example of the first embodiment.

FIG. 12B is a schematic perspective view of the hat-shaped member for explaining the basic configuration of the second embodiment.

FIG. 19 is a table illustrating results of summarizing presence or absence of occurrence of fracture of each spot welded portion after the three-point bending test in the example of the second embodiment.

DESCRIPTION OF EMBODIMENTS

Figure 1:
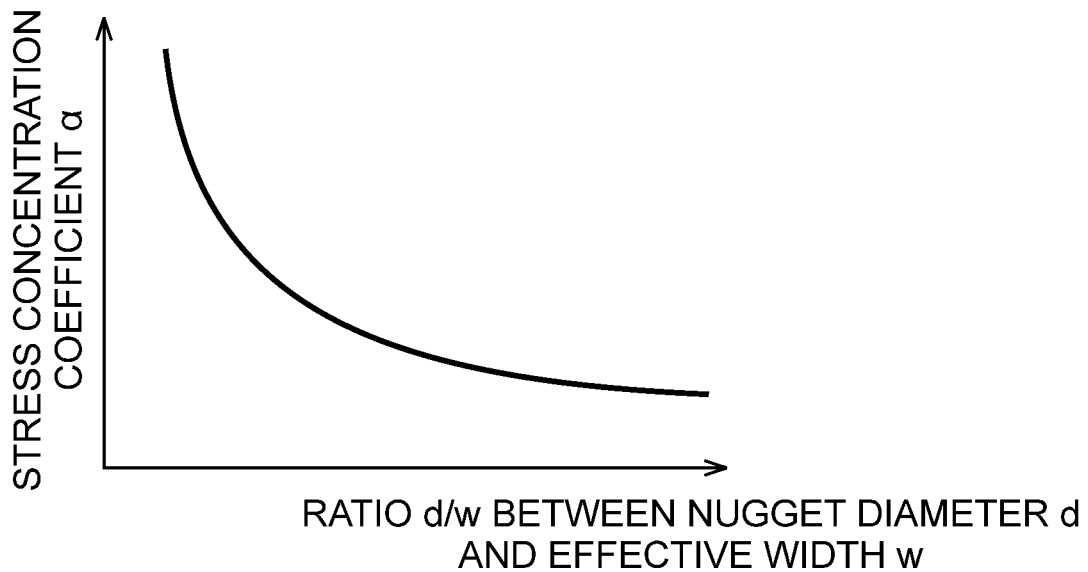
FIG. 1 is a characteristic chart illustrating a relation between a ratio (d/W) between a nugget diameter d of a member and an effective width W, and, a stress concentration coefficient α.

Hereinafter, embodiments of a fracture prediction method and device, a program, and a recording medium will be described in detail referring to the drawings.

First Embodiment

In this embodiment, a deformation simulation by the finite element method (FEM) is performed on a member joined by spot welding, as an object to be measured, to predict fracture of a spot welded portion of the member.

Figure 2:
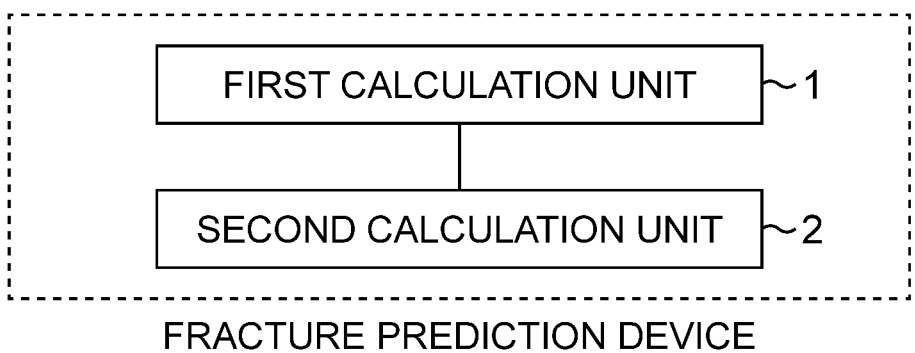
FIG. 2 is a schematic diagram illustrating a schematic configuration of a fracture prediction device according to a first embodiment.
Figure 3:
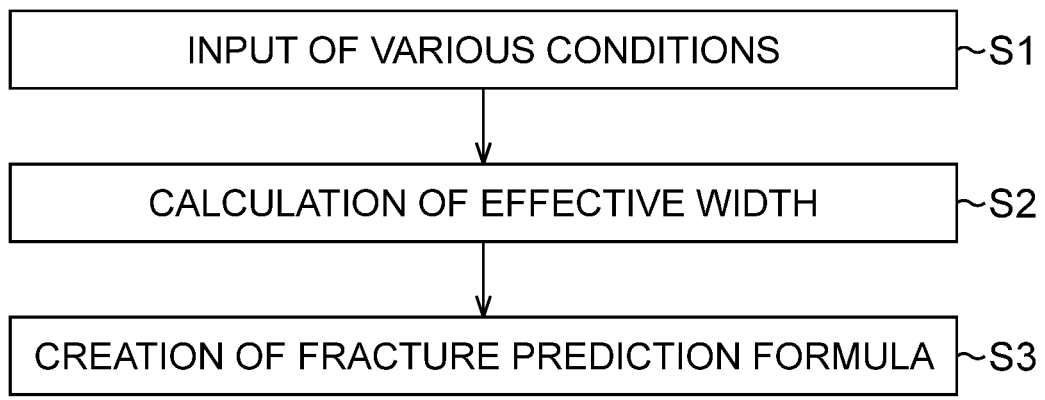
FIG. 3 is a flowchart illustrating a fracture prediction method according to the first embodiment in the order of steps.

FIG. 2 is a schematic diagram illustrating a schematic configuration of a fracture prediction device according to a first embodiment. FIG. 3 is a flowchart illustrating a fracture prediction method according to the first embodiment in the order of steps.

Figure 4:
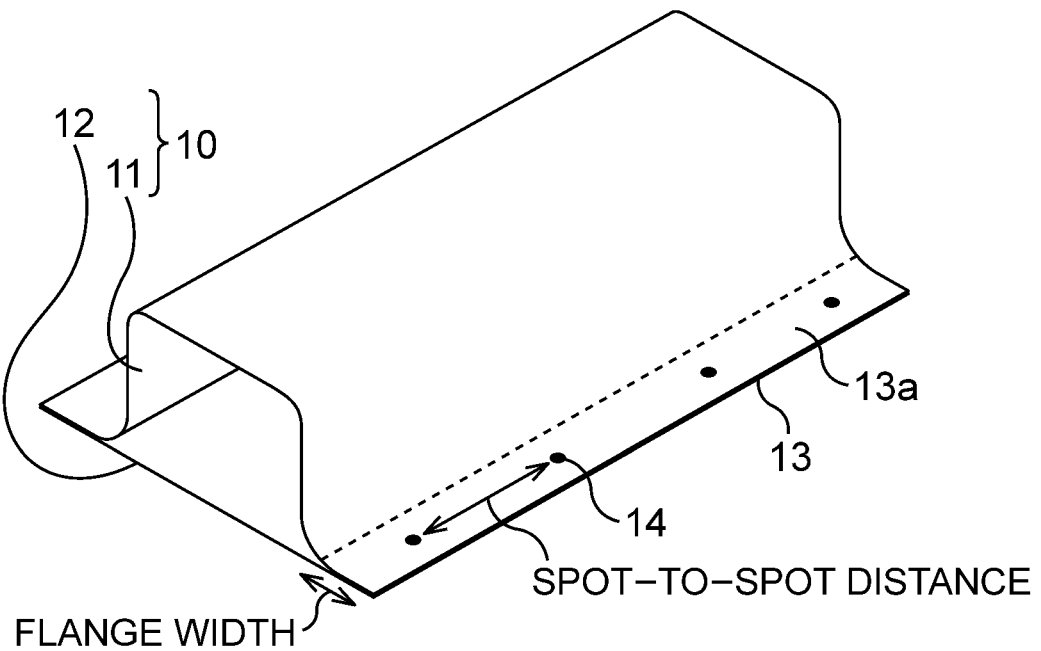
FIG. 4 is a schematic perspective view illustrating a hat-shaped member used as an object to be measured in this embodiment.

In this embodiment, as illustrated in FIG. 4, a hat-shaped member 10 is used as the object to be measured. The hat-shaped member 10 is a structural member having a hat-shaped cross section structure made by superimposing a base material. 11 being a hat-shaped cross section steel sheet formed in a hat shape and a base material 12 being a planar steel sheet, at a flange face 13a of a flange part 13, and joining the flange part 13 by spot welding. On the flange face 13a, spot welded portions 14 are formed at regular intervals along a long side direction. A distance between adjacent spot welded portions 14 is defined as a spot-to-spot distance, and a width of the flange part 13 in a short side direction is defined as a flange width.

The fracture prediction device according to this embodiment is configured including a first calculation unit 1 that creates a fracture prediction formula for the spot welded portion and a second calculation unit 2 that predicts fracture of the spot welded portion using the created fracture prediction formula as illustrated in FIG. 2.

For prediction of fracture of the spot welded portion 14 for the hat-shaped member 10, a user first inputs various conditions about the hat-shaped member 10 into the fracture prediction device as illustrated in FIG. 3 (Step S1). The various conditions include a tensile strength of a material, a total elongation, a carbon equivalent, a Young's modulus, a sheet thickness, a nugget diameter of the spot welded portion, an element size, a first with, and a second width of the hat-shaped member 10.

The first width and the second width are values used for calculating an effective width at later-described Step S2. The first width is a distance (spot-to-spot distance) between a spot welded portion focused on and a spot welded portion adjacent thereto on a flat surface (flange face 13a) of the member. The second width is a length of a virtual line segment passing through the spot welded portion focused on and intersecting the first width on the flange face 13a and having points where the virtual line segment comes into contact with edges or edge lines of the flat surface as both ends. In this embodiment, the spot-to-spot distance between the spot welded portions 14 is the first width, and the flange width of the flange face 13a is the second width.

Subsequently, the first calculation unit 1 calculates the effective width using the inputted spot-to-spot distance and flange width (Step S2). The effective width is one of prediction condition values being indexes of fracture prediction, and is a width in a direction including the spot welded portion and intersecting a direction of an input load, on the flat surface of the member where the spot welded portion is provided in this embodiment.

Figure 5:
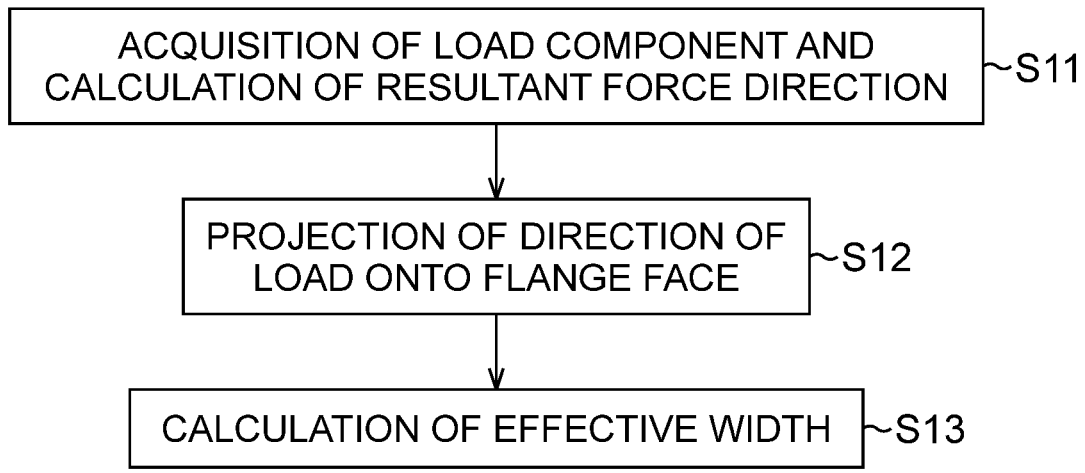
FIG. 5 is a flowchart illustrating Step S2 of the fracture prediction method according to the first embodiment in detail.

Step S2 is composed of Steps S11 to S13 in FIG. 5.

At Step S11, the first calculation unit 1 acquires a shear force component and an axial force of a load which is applied every second on the spot welded portion 14, and calculates a resultant force and its direction.

At Step S12, the first calculation unit 1 projects the direction of the load applied on the spot welded portion 14 onto the flange face 13a. The resultant force calculated at Step S11 can take any three-dimensional direction, and therefore a load direction is projected onto a surface where the spot welded portion is provided.

At Step S13, the first calculation unit 1 calculates the effective width in a direction intersecting the direction of the load projected onto the flange face 13a.

Figure 6A:
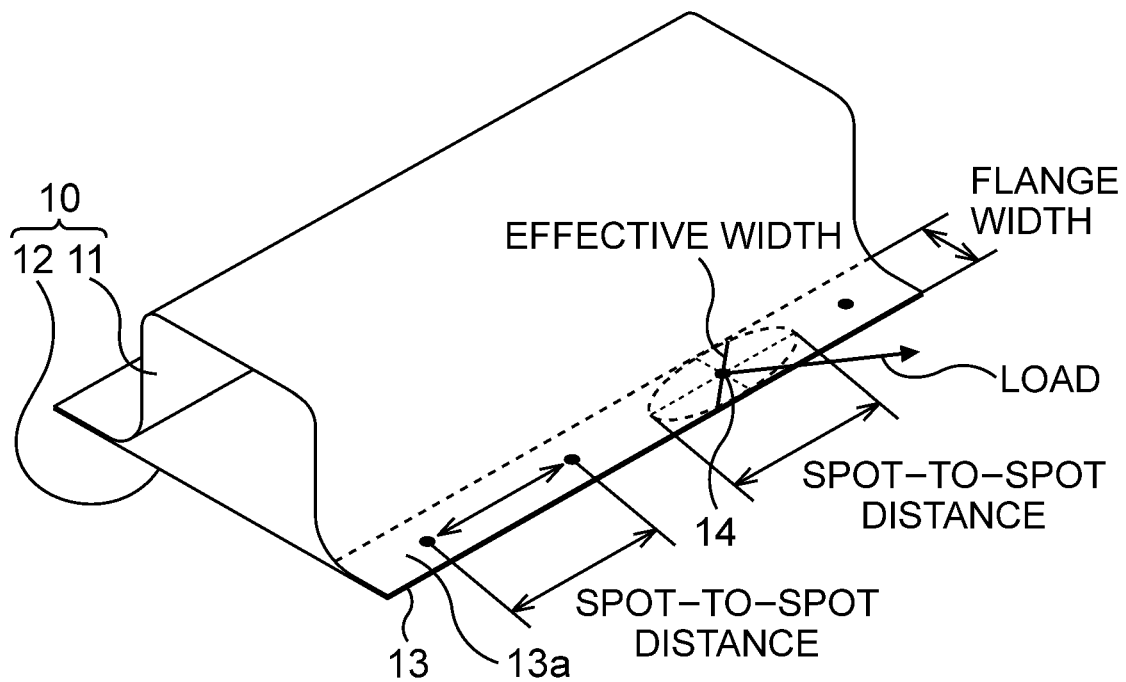
FIG. 6A is a schematic perspective view for explaining a case where an ellipse rule is applied to calculation of an effective width in the first embodiment.
Figure 6B:
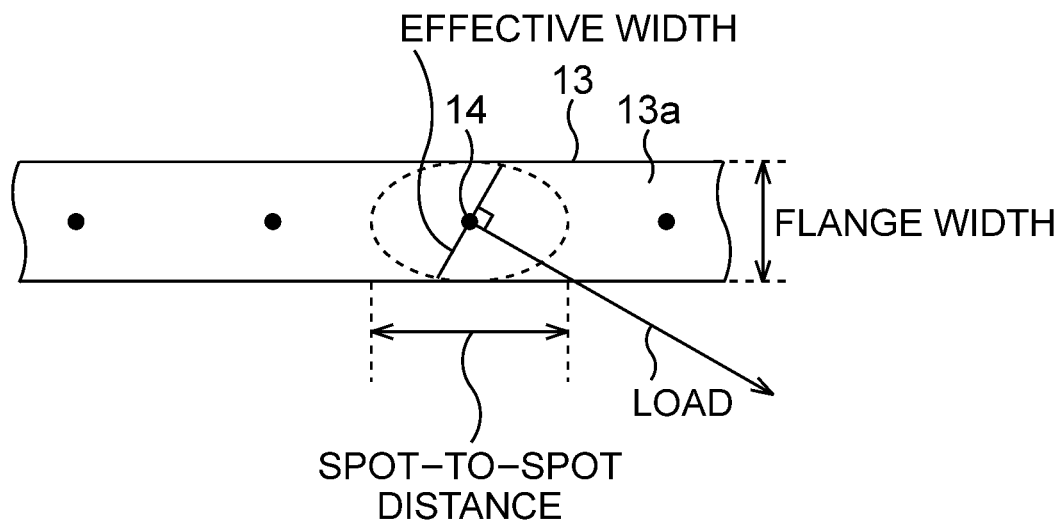
FIG. 6B is a schematic plan view for explaining the case where the ellipse rule is applied to calculation of the effective width in the first embodiment.

In this embodiment, for the calculation of the effective width, an ellipse rule using one of the spot-to-spot distance and the flange width as a major axis and using the other as a minor axis is applied. As illustrated in FIG. 6A, FIG. 6B, an ellipse formula is created using the spot welded portion 14 as a center, the spot-to-spot distance being the first width as the major axis, and the flange width being the second width as the minor axis. The first calculation unit 1 calculates, as the effective width, the diameter of an ellipse in the direction intersecting the direction of the load projected onto the flange face 13a at the spot welded portion 14.

Figure 7A:
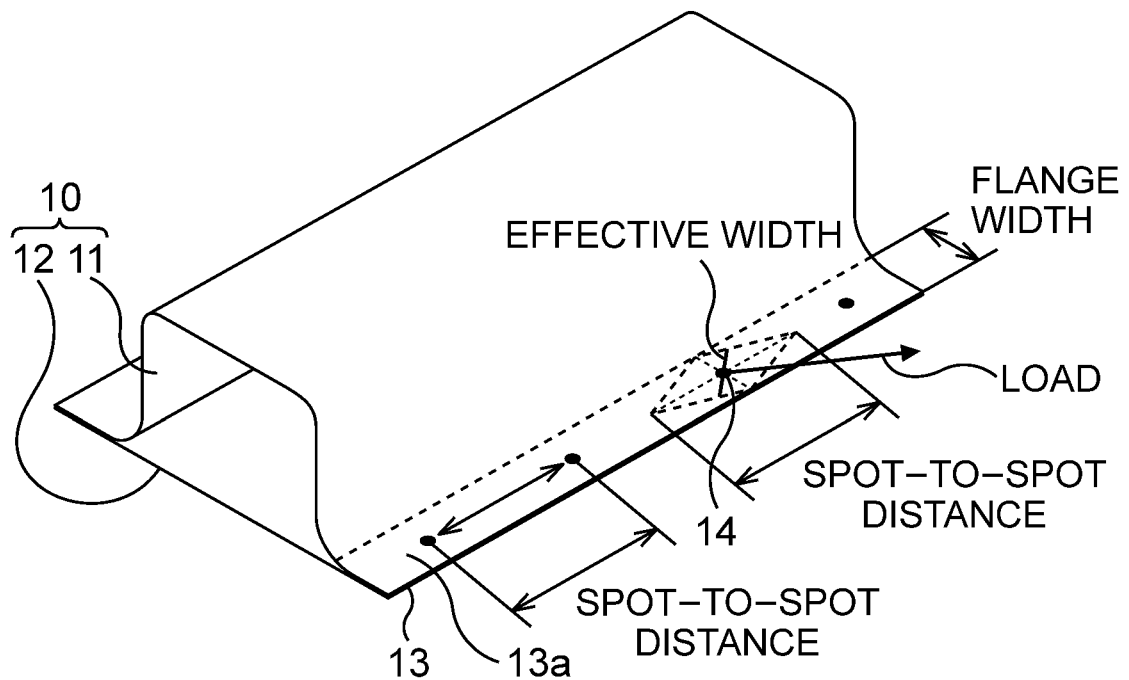
FIG. 7A is a schematic perspective view for explaining a case where a rhombus rule is applied to calculation of the effective width in the first embodiment.
Figure 7B:
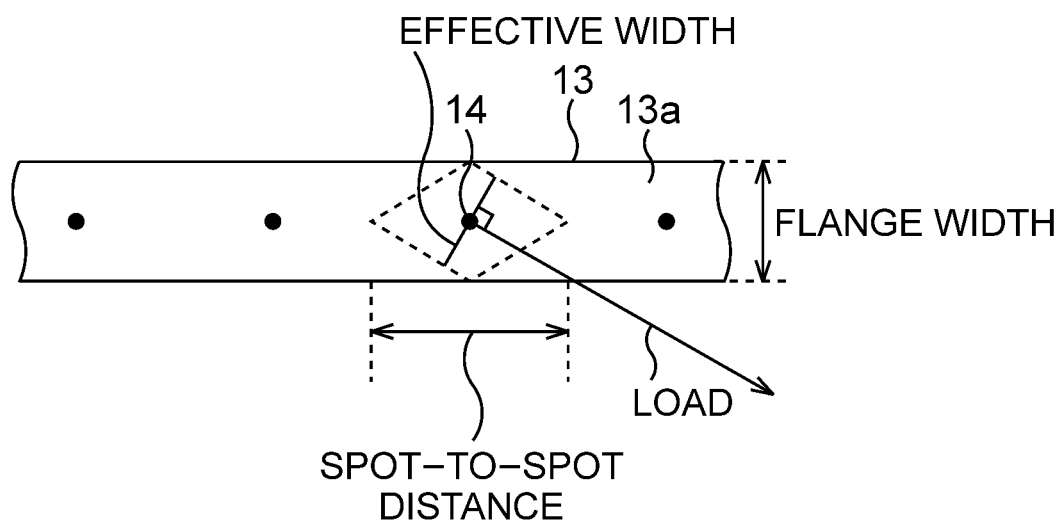
FIG. 7B is a schematic plan view for explaining the case where the rhombus rule is applied to calculation of the effective width in the first embodiment.

As the other calculation method of the effective width, a rhombus rule using one of the spot-to-spot distance and the flange width as the major axis and using the other as the minor axis may be employed in place of the ellipse rule. As illustrated in FIG. 7A, FIG. 7B, a rhombus formula is created using the spot welded portion 14 as a center, the spot-to-spot distance as the major axis, and the flange width as the minor axis. The first calculation unit 1 calculates, as the effective width, the length of a line segment crossing sides of a rhombus and intersecting the direction of the load projected onto the flange face 13a at the spot welded portion 14.

Figure 8:
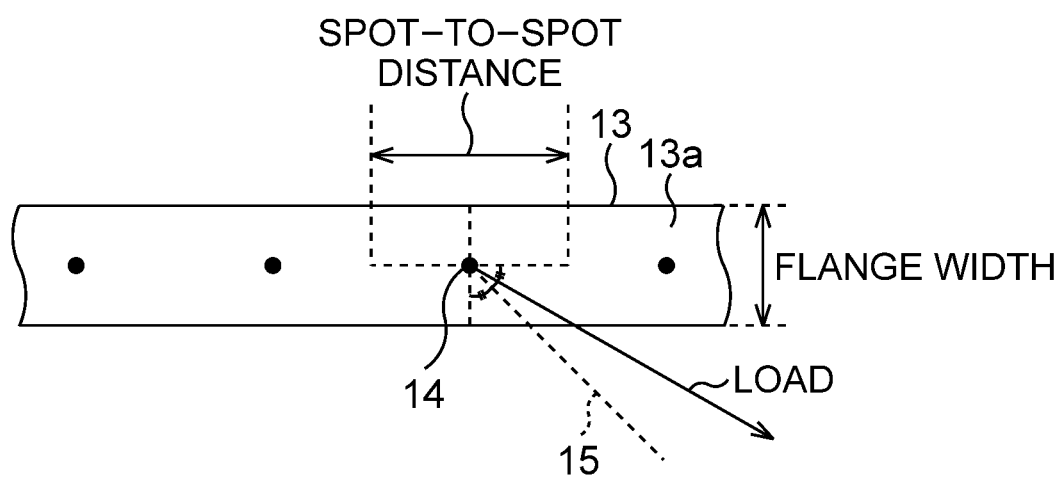
FIG. 8 is a schematic plan view for explaining a case where the effective width is decided without using the ellipse rule, the rhombus rule or the like in the first embodiment.

Further, it is also possible to select one of the spot-to-spot distance and the flange width, which is closer to the direction intersecting the input load, as the effective width without using the ellipse rule or the rhombus rule. More specifically, as illustrated in FIG. 8, a virtual boundary line 15 is assumed which divides an angle between a spot-to-spot distance direction and a flange width direction intersecting each other using the spot welded portion 14 as an origin, into two (which forms 45° with respect to both of the spot-to-spot distance direction and the flange width direction). In the case where the direction of the load projected onto the flange face 13a is closer to the spot-to-spot distance direction on the basis of the boundary line 15, the first calculation unit defines the flange width as the effective width. On the other hand, in the case where the direction of the load projected onto the flange face 13a is closer to the flange width on the basis of the boundary line 15, the first calculation unit defines the spot-to-spot distance as the effective width. In the case where the direction of the load projected onto the flange face 13a coincides with the boundary line 15, the first calculation unit defines the predetermined spot-to-spot distance or flange width as the effective width. Alternatively, in the case of the coincidence, it is also conceivable to define an average value of the spot-to-spot distance and the flange width as the effective width. The example in FIG. 8 illustrates the case where the direction of the load is closer to the spot-to-spot distance direction on the basis of the boundary line 15.

Subsequently, the first calculation unit 1 creates a fracture prediction formula using a material strength TS, a sheet thickness t, and a nugget diameter D of spot welding inputted at Step S1, and an effective width W calculated at Step S2 (Step S3).

More specifically, the fracture prediction formula in the case where a shear force is mainly applied on the spot welded portion is $$Fs = TS \cdot W \cdot t/\alpha \quad (1)$$

$$\alpha = a/(D/W)^b + c$$

where Fs is a fracture prediction load, and a, b, c are parameters for fitting experimental results.

Besides, the fracture prediction formula in the case where an axial force is mainly applied on the spot welded portion is $$Fn = (d \cdot D \cdot t + e) \cdot (f \cdot t + g) \cdot (h \cdot TS + i) \cdot (j \cdot C_{eq} + k) \quad (2)$$

where Fn is a fracture prediction load, $C_{eq}$ is a carbon equivalent, and d, e, f, g, h, i, j, k are parameters for fitting experimental results.

Besides, the fracture prediction formula in the case where a moment is mainly applied on the spot welded portion is $$Mf = (l \cdot el \cdot E \cdot D \cdot t^3 + m) \cdot (n \cdot t + o) \cdot (p \cdot D + q) \cdot (r \cdot W + s) \cdot (n \cdot L + v) \cdot (y \cdot Me + z) \quad (3)$$

where Mf is a fracture prediction moment, el is a total elongation of a material, E is a Young's modulus of a member, L is an arm length, Me is an element size, and l, m, n, o, p, q, r, s, u, v, y, z are parameters for fitting experimental results. The arm length is defined as a distance between a spot welding center and a vertical wall in an L-shape joint, but a value of ½ of the width in the direction intersecting the effective width calculated at Step S2, namely, a value of ½ of the width in a direction parallel to the direction of the load is defined as the arm length in the member being an object to be discussed.

Note that the (1) formula, the (2) formula, or the (3) formula does not always need to be used, but any formula may be used as long as the formula can fit experimental results.

Subsequently, fracture of the spot welded portion is predicted using the second calculation unit 2.

More specifically, assuming that the input applied to the spot welded portion is a shear force S, an axial force A, and a moment M, fracture is determined to have occurred when one of a (4) formula, a (5) formula, and a (6) formula being a relational expression composed of the above values and the (1) formula, the (2) formula, or the (3) formula is established.

$$(S^2+A^2)^{0.5}/Fs \geq 1 \quad (4)$$

$$A/Fn \geq 1 \quad (5)$$

$$M/Mf \geq 1 \quad (6)$$

A collision deformation simulation by the finite element method of the hat-shaped member 10 is subjected to calculation every predetermined time interval. A load component applied to the spot welded portion 14 according to the deformation of the member is also calculated every predetermined time interval. The first calculation unit 1 acquires the effective width in the direction intersecting the direction of the load calculated every predetermined time interval and creates the fracture prediction formula, and the second calculation unit 2 performs fracture prediction.

More specifically, above-described Step S2 (Step S11 to S13) is executed to calculate the effective width every predetermined time interval, and Step S3 is executed to perform fracture prediction based on the fracture prediction formula created using the effective width W calculated at Step S2. Here, the creation of the ellipse formula at Step S13 is performed only at first Step S13, and at subsequent Step S13 every predetermined time interval, the effective width corresponding to the direction of the load calculated every predetermined time interval is calculated using the ellipse formula created at first Step S13.

As described above, according to this embodiment, for example, in the case of performing collision deformation prediction of an automobile member on a computer, fracture prediction of the spot welded portion where the spot welding is modeled can be performed with high accuracy. This makes it possible to omit a collision test using an actual automobile member or to significantly reduce the number of times of collision test. Further, the member design for preventing fracture at collision can be precisely performed on the computer, thus contributing to a significant cost reduction and reduction in developing period.

Example

Hereinafter, the operation and effect of the above-described first embodiment will be described based on comparison with the prior art.

Figure 9A:
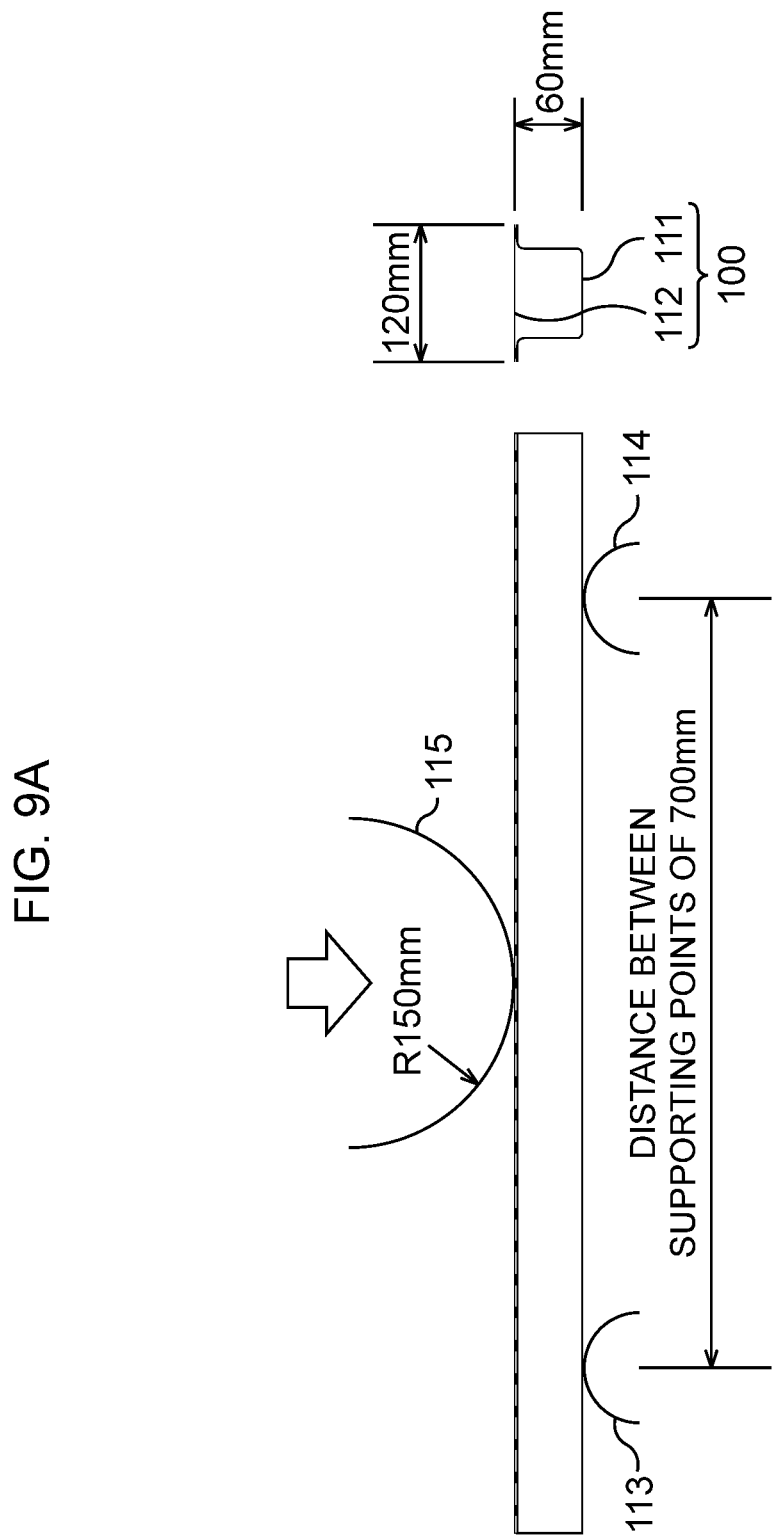
FIG. 9A is a schematic side view illustrating a hat-shaped member used in an example of the first embodiment and a status of a three-point bending test.
Figure 9B:
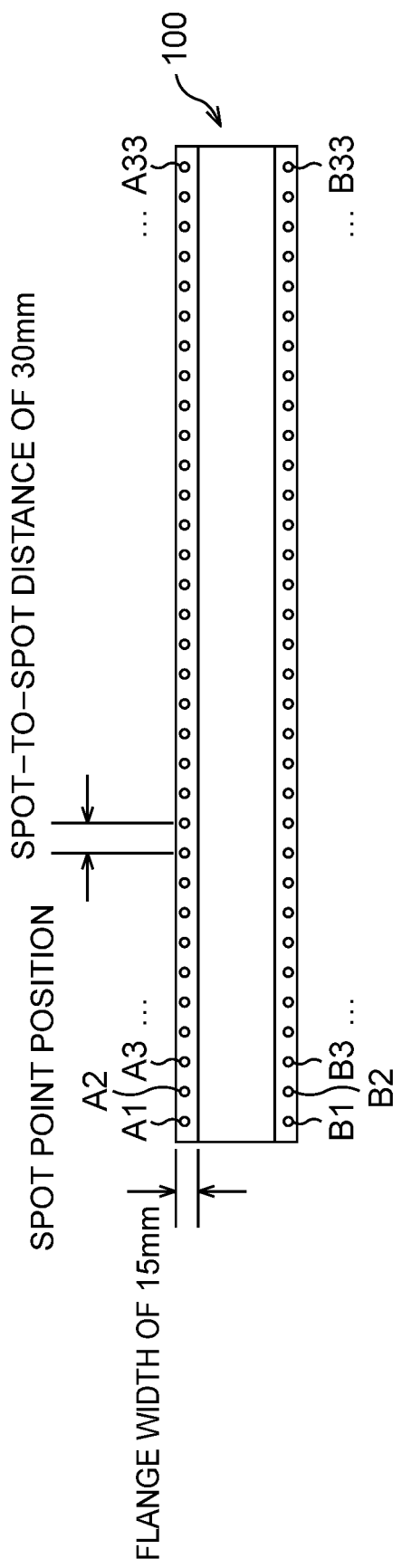
FIG. 9B is a schematic plan view illustrating the hat-shaped member used in the example of the first embodiment and the status of the three-point bending test.

In this example, as illustrated in FIG. 9A, FIG. 9B, a three-point bending test was performed using a hat-shaped member 100 having a height of 60 mm and a width of 120 mm. In the hat-shaped member 100, a base material 111 being a hat-shaped cross section steel sheet and a base material 112 being a planar steel sheet are joined together at 66 spot welded portions, the spot-to-spot distance is 30 mm and the flange width is 15 mm. As illustrated in FIG. 9B, positions of the spot welded portions in the hat-shaped member 100 are defined to be an A row (A1 to A33) and a B row (B1 to B33).

The material of the hat-shaped member 100 was a steel sheet having a tensile strength of 1500 MPa class, and both of the base materials 111, 112 were formed into a sheet thickness of 1.6 mm. At this time, the nugget diameter of the spot welded portion was 6.3 mm. The three-point bending test was performed by pressing an impactor 115 having an R of 150 mm at a stroke of 60 mm from the base material 112 side with the hat-shaped member 100 supported by fixing jigs 113, 114 and the distance between supporting points of the fixing jigs 113, 114 set to 700 mm.

Further, an FEM model reproducing the experimental conditions was created, and a program according to the present invention was installed therein. The direction of the load applied to the spot welded portion was calculated sequentially every predetermined time interval, the effective width in the direction intersecting the load direction was calculated by the ellipse rule, fracture criteria were calculated using the effective width, and fracture prediction of each spot welded portion was performed. Note that, for comparison, fracture prediction was also performed for the case of fixing the effective width to a spot interval as the prior art 1 and for the case of fixing the effective width to the flange width as the prior art 2.

FIG. 10 is a table illustrating the results of summarizing the presence or absence of occurrence of fracture of each spot welded portion after the three-point bending test for the A row (A1 to A33) and the B row (B1 to B33) being the positions of the spot welded portions. The presence or absence of occurrence of fracture of each spot welded portion was compared with the experimental result, and the percentage of the number of points for which the presence or absence of occurrence of fracture was able to be correctly predicted was obtained for all of 66 points.

The hitting ratio in the case of predicting the fracture by the method of the first embodiment was 100%. The hitting ratio in the case of fixing the effective width to the spot interval in the prior art was 80.3%, and the hitting ratio in the case of fixing the effective width to the flange width in the prior art was 90.9%.

From the above results, it is found that a variation occurs in fracture prediction accuracy between the case of setting the effective width to the spot interval and the case of setting the effective width to the flange width in the prior arts. In contrast to this, it was able to confirm that use of the method of the first embodiment significantly improved the fracture prediction accuracy and made it possible to obtain stable fracture prediction accuracy according to the change in the direction of the load applied on the spot welded portion due to deformation of the member.

Second Embodiment

In this embodiment, a deformation simulation by the finite element method (FEM) is performed on a member joined by spot welding, as an object to be measured as in the first embodiment, to predict fracture of a spot welded portion of the member. In this embodiment, the first width for calculating the effective width and the second width intersecting the first width can be acquired with higher accuracy. Combination with the first embodiment further improves the accuracy of the fracture prediction.

—Basic Configuration of this Embodiment—

First of all, the basic configuration of a condition acquisition method according to this embodiment will be described.

Figure 11A:
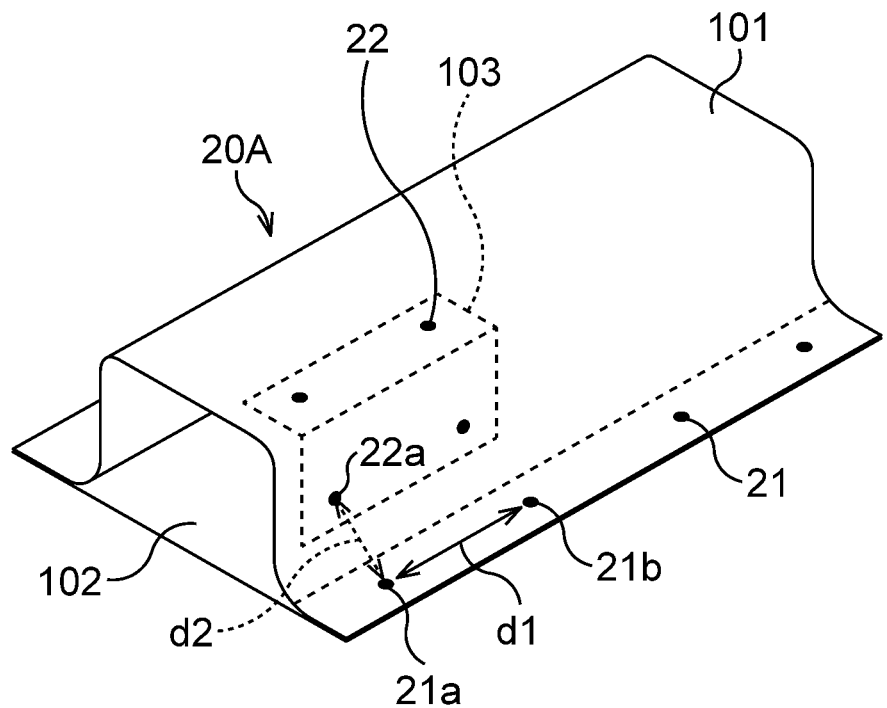
FIG. 11A is a schematic perspective view of the hat-shaped member for explaining a problem in a prior art.
Figure 11B:
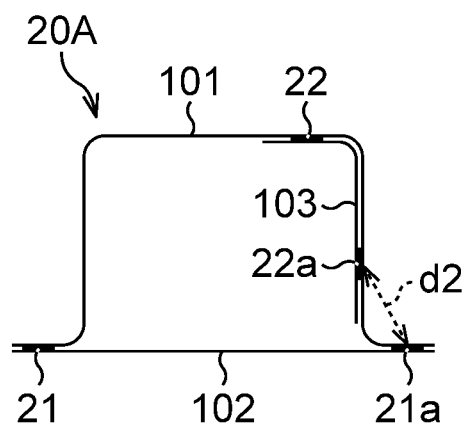
FIG. 11B is a schematic cross-sectional view of the hat-shaped member for explaining the problem in the prior art.

In a hat-shaped member 20A, as illustrated in FIG. 11A, FIG. 11B, for example, a base material 103 is arranged on the rear surface side of a base material 101 and the base materials 101, 103 are joined together by a spot welded portion 22 in some cases. In this case, a case of acquiring the distance between a spot welded portion focused on and a spot welded portion closest thereto as the effective width using the technique of Patent Literature 5 will be considered. In the case of focusing on a spot welded portion 21a, since a spot welded portion 21 is for joining the base materials 101, 102, a spot welded portion closest to the spot welded portion 21a should be 21b and a distance d1 between the spot welded portions 21a and 21b should be the first width for calculating the effective width. However, since a spot welded portion closest to the spot welded portion 21a on the surface of the base material 101 is 22a, a distance d2 between the spot welded portions 21a and 22a will be acquired as the first width. Since the spot welded portion 22a is for joining the base materials 101, 103, a wrong first width will be acquired, failing to perform precise simulation. In other words, in the case of focusing only on the distance between spot welded portions, there is a possibility that the distance between spot welded portions on different members or flat surfaces is employed so that correct fracture prediction is not performed.

(1) In this embodiment, an angular difference in a normal direction between shell elements of the base material is acquired for the member to be joined by spot welding. Based on the acquired angular difference, base material portions are classified into constitution surfaces. Spot welded portions belonging to the constitution surfaces are classified into the classified constitution surfaces. Then, the first width and the second width regarding the spot welded portion are acquired for each of the constitution surfaces, and the effective width is acquired by the method described in the first embodiment.

As the first width, the distance between the spot welded portion focused on and the spot welded portion closest thereto belonging to the same constitution surface as that of the spot welded portion focused on is employed. As the second width, the width of the constitution surface (the constitution surface is classified according to the angular difference in the normal direction between the shell elements, and is a flat surface corresponding to within a predetermined angular difference) in the direction intersecting the distance between the spot welded portion focused on and the spot welded portion closest thereto is employed.

The base material is modeled by the shell element, and the spot welded portion is modeled by the beam element (bar element), shell element, solid element and so on. The beam element is a line segment element having two nodes, the shell element is a plane element having, for example, four nodes, and the solid element is a three-dimensional element having, for example, eight nodes. For example, in a model in which base materials A, B are connected by spot welding, the spot welded portion is modeled by the beam element having end points a, b (an a side is connected to the base material A, and a b side is connected to the base material B), and the base materials A, B are modeled by the shell element. Then, for each of the end points a, b being both ends of the beam element, the distance between closest spot welded portions and the flat surface width in the direction intersecting the distance between spot welded portions on the base materials to be connected together are acquired, and set as the first width and the second width, respectively.

Figure 12A:
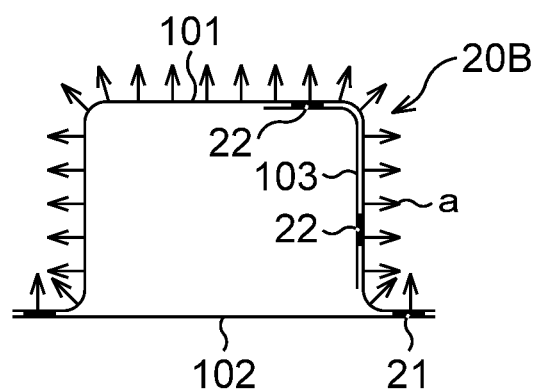
FIG. 12A is a schematic cross-sectional view of a hat-shaped member for explaining a basic configuration of a second embodiment.

A concrete example of (1) is illustrated in FIG. 12A and FIG. 12B. Here, the base material 101 among the base materials 101 to 103 constituting a hat-shaped member 20B will be described as an example.

Each of flat surfaces (hereinafter, referred to as constitution surfaces) constituting the surface of the base material 101 will be considered. The effective width acquired for the spot welded portions formed on the same constitution surface is a precise effective width to be supplied for spot fracture prediction. Hence, in this embodiment, the angular difference in the normal direction between adjacent shell elements is successively calculated for the base material 101 so as to handle the base material 101 separated into constitution surfaces as illustrated in FIG. 12A, and the surface of the base material 101 is classified into constitution surfaces. When the angular difference is within a predetermined value, equal to or less than a predetermined value defined within a range of about 0° to 45°, for example, equal to less than 15°, the surface of the base material 101 between corresponding shell elements is regarded as the flat surface. In other words, a plurality of shell elements having the angular difference within the predetermined value is regarded as belonging to the same constitution surface. In this manner, the surface of the base material 101 is classified into a constitution surface A being a top plate surface, constitution surfaces B1, B2 being connecting surfaces, constitution surfaces C1, C2 being vertical wall surfaces, constitution surfaces D1, D2 being connecting surfaces, and constitution surfaces E1, E2 being flange faces as illustrated, for example, in FIG. 12B.

Then, spot welded portions belonging to the same constitution surface are classified into the constitution surfaces A to E2. In the example in FIG. 12B, two spot welded portions 22 are classified into the constitution surface A, two spot welded portions 22 are classified into each of the constitution surfaces C1, C2, four spot welded portions 21 are classified into each of the constitution surfaces E1, E2. Then, the first width and the second width are acquired for the spot welded portions classified as being formed on the same constitution surface. Thus, the precise effective width to be supplied for spot fracture prediction can be acquired. Taking the constitution surface E1 as an example and focusing on the spot welded portion 21a, the wrong distance d2 as in FIG. 11A, FIG. 11B is not acquired as the first width, but the correct distance d1 as in FIG. 12B will be acquired as the first width.

(2) In this embodiment, the first width and the second width are acquired as in the above also for a base material on the rear surface side to be arranged to face the above base material and joined thereto by spot welding portion.

Figure 13A:
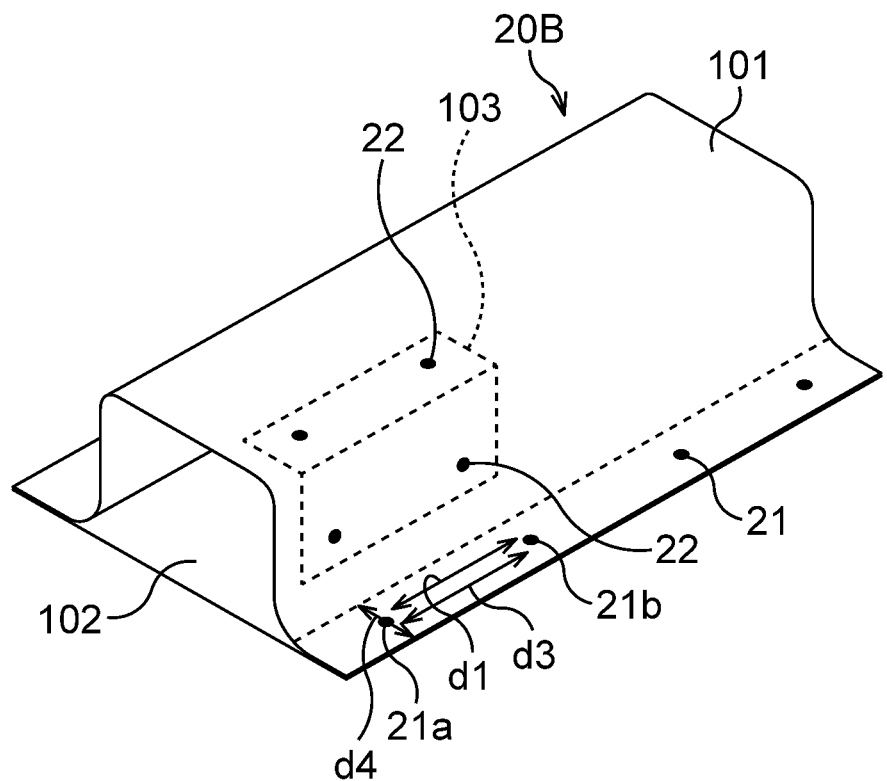
FIG. 13A is a schematic perspective view of the hat-shaped member for explaining the basic configuration of the second embodiment.
Figure 13B:
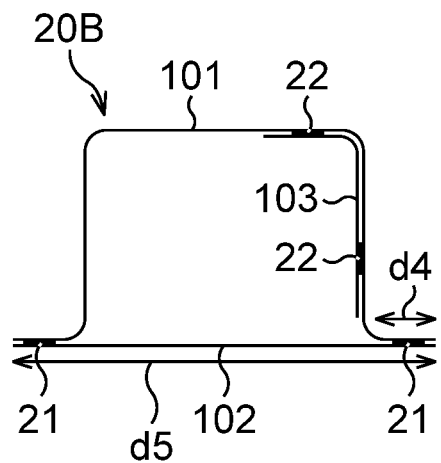
FIG. 13B is a schematic cross-sectional view of the hat-shaped member for explaining the basic configuration of the second embodiment.

A concrete example of (2) is illustrated in FIG. 13A and FIG. 13B. In the hat-shaped member 20B, the base material 101 is joined with the base materials, 102, 103 on its rear surface by the spot welded portions 21, 22. Also for the base materials 102, 103, the first width and the second width are acquired as with the base material 101 to calculate the effective width. Here, the base materials 101, 102 among the plurality of base materials constituting the hat-shaped member 20B will be described as examples.

As in FIG. 13A, FIG. 13B, focusing on the spot welded portion 21a, the distance d1 is acquired as the first width and a distance d4 being the width of the constitution surface in the direction intersecting the distance d1 is acquired as the second width in the base material 101 as described above. In the base material 102, there is one constitution surface in terms of angular difference in the normal direction between shell elements. As the first width of the base material 102, a distance d3 is acquired as the first width as with the distance d1 of the base material 101, and a distance d5 being the width of the constitution surface in the direction intersecting the distance d3 is acquired as the second width as illustrated in FIG. 13B. However, in an actual simulation, upper limits of the first width and the second width are set, and a predetermined value smaller than the distance d5 is set as the second width.

(3) In this embodiment, the first width and the second width are acquired for the spot welded portion focused on in the case where the base material on the rear surface side joined by the spot welded portion focused on and the base material on the rear surface side joined by the spot welded portion closest to the spot welded portion focused on are the same.

Figure 14A:
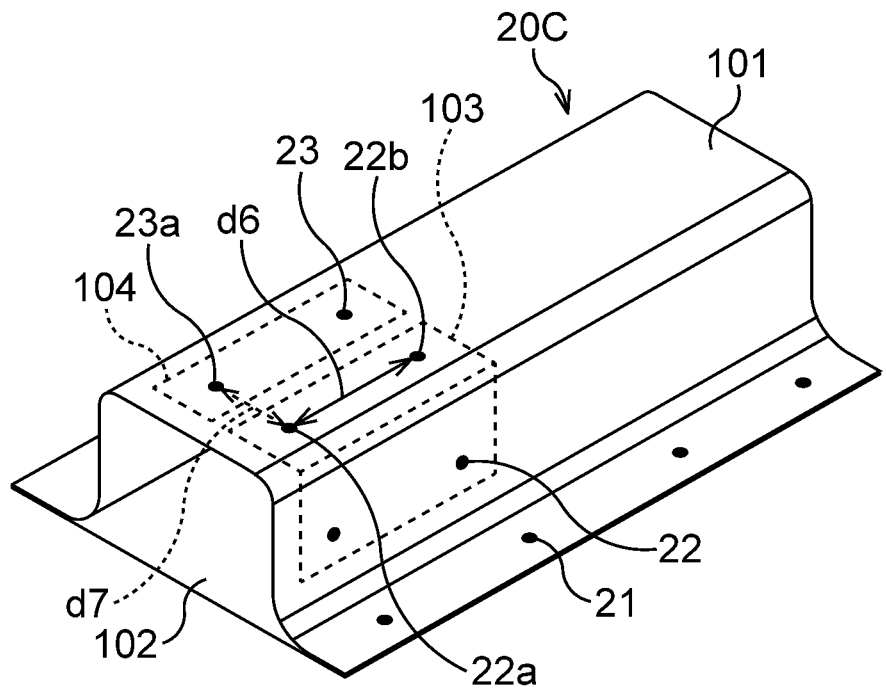
FIG. 14A is a schematic perspective view of the hat-shaped member for explaining the basic configuration of the second embodiment.
Figure 14B:
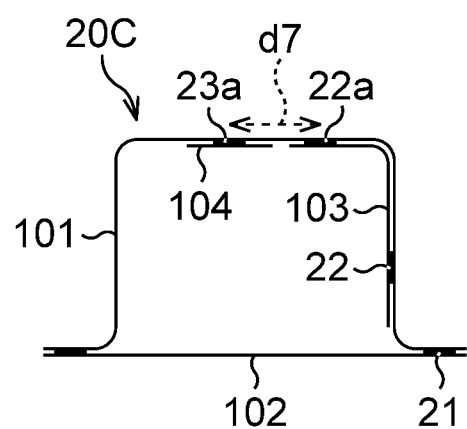
FIG. 14B is a schematic cross-sectional view of the hat-shaped member for explaining the basic configuration of the second embodiment.

A concrete example of (3) is illustrated in FIG. 14A and FIG. 14B. In a hat-shaped member 20C, the base material 101 is joined with base materials 102, 103, 104 on its rear surface by the spot welded portions 21, 22. The base material 104 is joined with the constitution surface A of the base material 101 by spot welded portions 23.

As in FIG. 14A, FIG. 14B, the constitution surface A of the base material 101 includes two spot welded portions 22 and two spot welded portions 23. Without consideration of information on the base materials 103, 104 on the rear surface side when acquiring the first width and the second width for the base material 101, a wrong determination will be made that a spot welded portion closest to a spot welded portion 22a focused on is not a spot welded portion 22b but a spot welded portion 23a. Then, as the first width on the constitution surface A of the base material 101, not a distance d6 but a distance d7 will be wrongly acquired. The spot welded portion 22a focused on is to join the base materials 101 and 103, and the closest spot welded portion similarly joining the base materials 101 and 103 is 22b, and therefore the correct first width is the distance d6. The spot welded portion 23a is to join the base materials 101 and 104, and therefore the distance d7 is a wrong first width.

Hence, in this embodiment, as for the spot welded portion 23a closest to the spot welded portion 22a focused on, an object to be joined by the spot welded portion 23a is the base material 104 which is different from the base material 103 joined by the spot welded portion 22a, and therefore the distance d7 is not employed as the first width. Besides, as for the spot welded portion 22b next closest to the spot welded portion 22a focused on, an object to be joined by the close spot welded portion 22b is the base material 103 which is the same base material 103 joined by the spot welded portion 22a, and therefore the distance d6 is employed as the first width. As described above, in this embodiment, in consideration of the case where the base materials to be joined with the base material being the constitution surface are different even at the spot welded portions belonging to the same constitution surface, the precise first width and second width can be acquired in such a case.

—Concrete Configurations of Condition Acquisition Device and Method—

Figure 15:
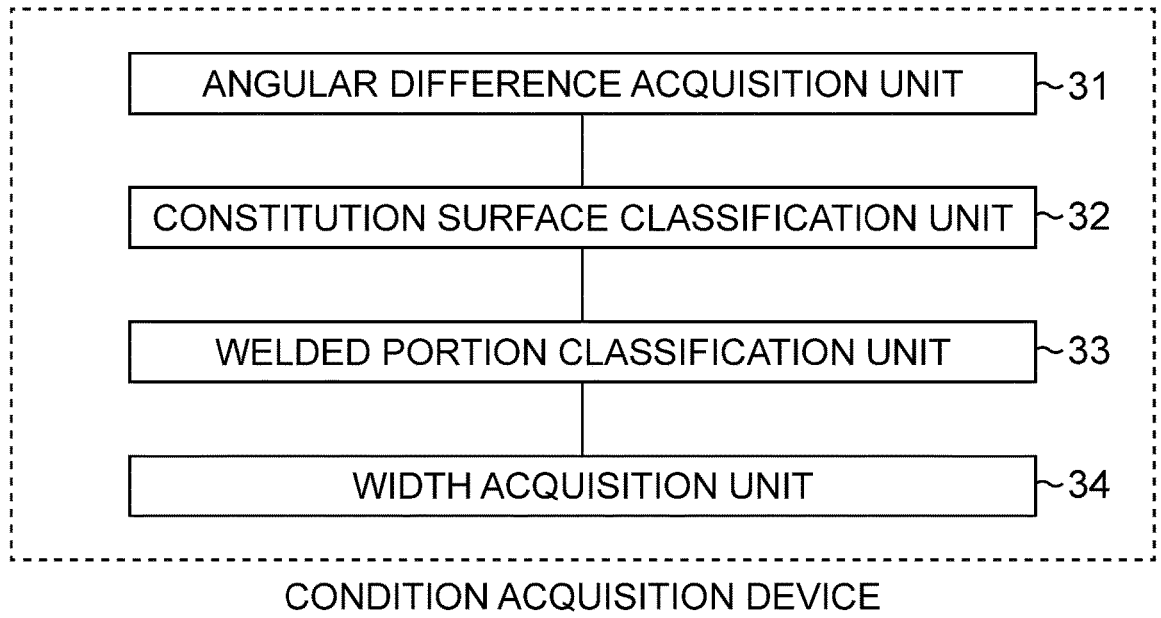
FIG. 15 is a schematic diagram illustrating a schematic configuration of a condition acquisition device according to the second embodiment.
Figure 16:
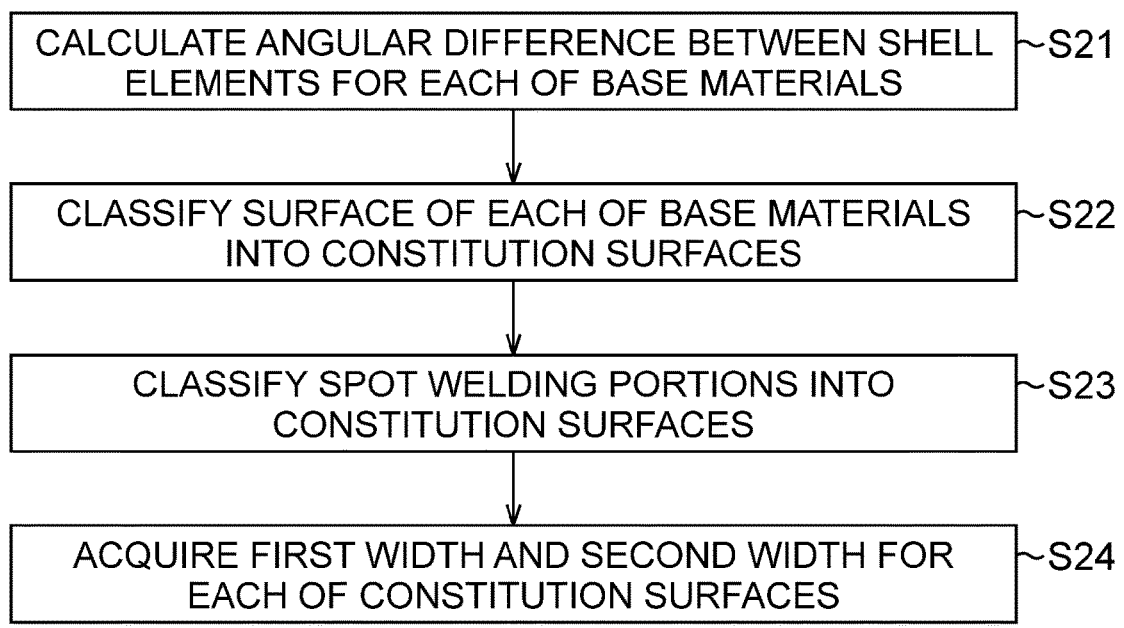
FIG. 16 is a flowchart illustrating a condition acquisition method according to the second embodiment in the order of steps.

FIG. 15 is a schematic diagram illustrating a schematic configuration of the condition acquisition device according to the second embodiment. FIG. 16 is a flowchart illustrating the condition acquisition method according to the second embodiment in the order of steps.

The condition acquisition device according to this embodiment is configured including an angular difference acquisition unit 31, a constitution surface classification unit 32, a welded portion classification unit 33, and a width acquisition unit 34 as illustrated in FIG. 15.

The angular difference acquisition unit 31 acquires the angular difference in the normal direction between shell elements of each of the base materials for each of the base materials to be joined by spot welding.

The constitution surface classification unit 32 classifies the surface of each of the base materials into constitution surfaces, based on the acquired angular difference.

The welded portion classification unit 33 classifies the spot welded portions belonging to the constitution surfaces into the classified constitution surfaces, for each of the base materials.

The width acquisition unit 34 acquires the first width and the second width regarding the spot welded portion for each of the classified constitution surfaces for each of the base materials. Here, when the base material on the rear surface side joined by the spot welded portion focused on and the base material on the rear surface side joined by the spot welded portion closest to the spot welded portion focused on are the same, the first width and the second width are acquired for the spot welded portion focused on.

To create an analysis model for performing a simulation by FEM using, for example, the hat-shaped member as the object to be measured and acquire the effective width of the analysis model, the angular difference acquisition unit 31 first acquires the angular difference in the normal direction between adjacent shell elements of each of the base materials for each of the base materials joined by spot welding and composed of shell elements (Step S21). Employing FIG. 14A, FIG. 14B as an example, the angular difference in the normal direction between adjacent shell elements will be acquired for each of the base materials 101 to 104.

Subsequently, the constitution surface classification unit 32 classifies the surface of each of the base materials into constitution surfaces, based on the acquired angular difference (Step S22). When the angular difference is equal to or less than a predetermined value defined within the range of about 0° to 45°, for example, equal to less than 15°, the surface of each of the base materials is classified as the same constitution surface. Employing the base material 101 in FIG. 12A, FIG. 12B as an example, its surface is classified into the constitution surface A being the top plate surface, the constitution surfaces B1, B2 being the connecting surfaces, the constitution surfaces C1, C2 being the vertical wall surfaces, the constitution surfaces D1, D2 being the connecting surfaces, and the constitution surfaces E1, E2 being the flange faces.

Subsequently, the welded portion classification unit 33 classifies the spot welded portions belonging to the constitution surfaces into the classified constitution surfaces, for each of the base materials (Step S23). Employing the base material 101 in FIG. 12A, FIG. 12B as an example, two spot welded portions 22 and two spot welded portions 23 are classified into the constitution surface A, two spot welded portions 22 are classified into each of the constitution surfaces C1, C2, and four spot welded portions 22 are classified into each of the constitution surfaces E1, E2.

Subsequently, the width acquisition unit 34 acquires the first width and the second width regarding the spot welded portion for each of the classified constitution surfaces for each of the base materials (Step S24). Here, when the base material on the rear surface side joined by the spot welded portion focused on and the base material on the rear surface side joined by the spot welded portion closest to the spot welded portion focused on are the same, the first width and the second width are acquired for the spot welded portion focused on. The base material 101 in FIG. 14A, FIG. 14B is taken as an example, and the spot welded portion 22a is focused on. In this case, since the spot welded portion 22a joins the base materials 101, 103, the width acquisition unit 34 acquires as the first width the distance d6 between the spot welded portion 22a and the spot welded portion 22b similarly joining the base materials 101, 103, among the spot welded portions close to the spot welded portion 22a within the constitution surface A. The width acquisition unit 34 further acquires as the second width the width intersecting the first width on the constitution surface of the base material 103 facing the constitution surface A.

In this embodiment, after the first width and the second width are acquired for each spot welded portion on the constitution surface of each of the base materials as described above, Steps S1, S2 (Steps S11 to S13), S3 described in the first embodiment are executed using the first width and the second width. The first calculation unit 1 acquires the effective width in the direction intersecting the direction of the load calculated every predetermined time interval using the first width and the second width and creates the fracture prediction formula, and the second calculation unit 2 performs fracture prediction.

As described above, according to this embodiment, even in the case where a member being a test object is made by joining, for example, three or more base materials by spot welding, it becomes possible to precisely acquire predetermined widths (the first width and the second width) of the member required for calculating the effective width acquired according to the first embodiment and to more precisely perform fracture prediction of the spot welded portion obtained by modeling spot welding.

Example

Hereinafter, the operation and effect of the above-described second embodiment will be described based on comparison with the prior art.

Figure 17A:
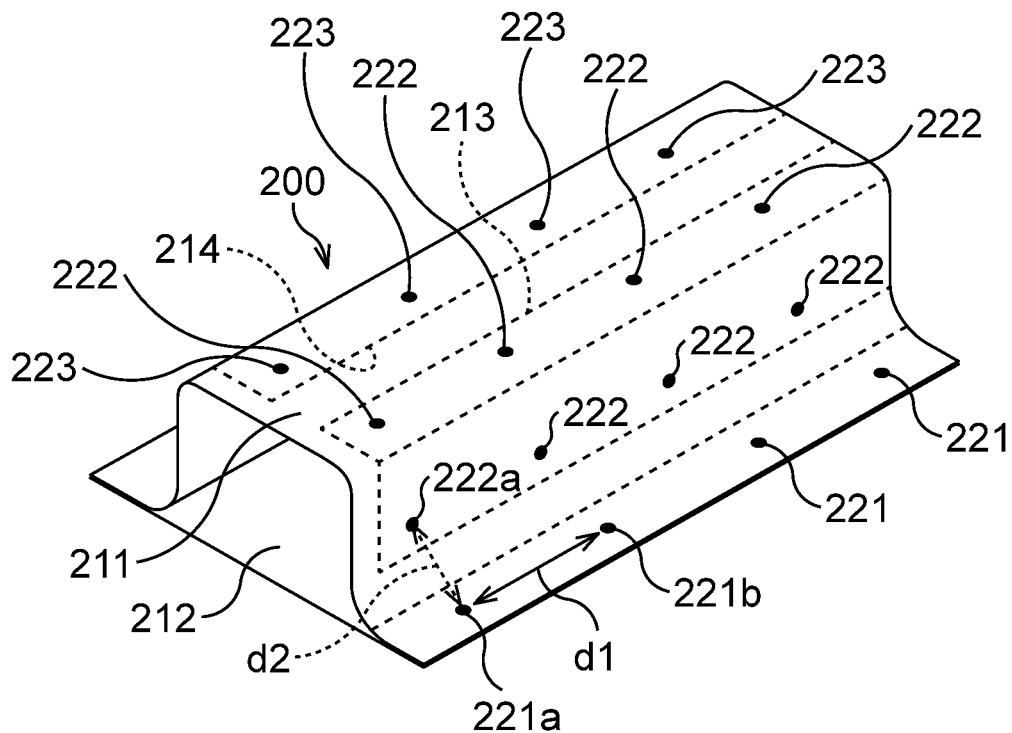
FIG. 17A is a schematic side view illustrating a hat-shaped member used in an example of the second embodiment.
Figure 17B:
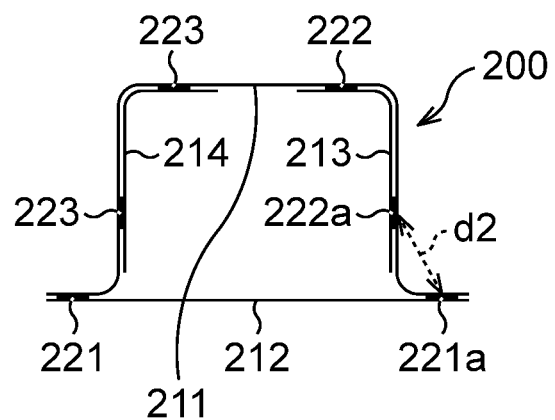
FIG. 17B is a schematic cross-sectional view illustrating the hat-shaped member used in the example of the second embodiment.

A hat-shaped member 200 used as the object to be measured in this example is illustrated in FIG. 17A, FIG. 17B. In the hat-shaped member 200, a base material 211 being the hat-shaped cross section steel sheet and a base material 212 being a planar steel sheet are joined together by spot welding at the flange face, base materials 213, 214 being reinforcing steel sheets are arranged on the rear surface side of the base material 211, and the base material 211 and the base material 213 are joined together by spot welding and the base material 211 and the base material 214 are joined together by spot welding. A spot welded portion joining the base material 211, 212 is 221. A spot welded portion joining the base material 211, 213 is 222. A spot welded portion joining the base material 211, 214 is 223. In the hat-shaped member 200, the spot-to-spot distance between the spot welded portions 222 joining the base materials 211, 213 (for example, the distance d2 between spot welded portions 221a and 222a) is shorter than the spot-to-spot distance between the spot welded portions 221 joining the base materials 211, 212 (for example, the distance d1 between adjacent spot welded portions 221a and 221b).

Figure 18A:
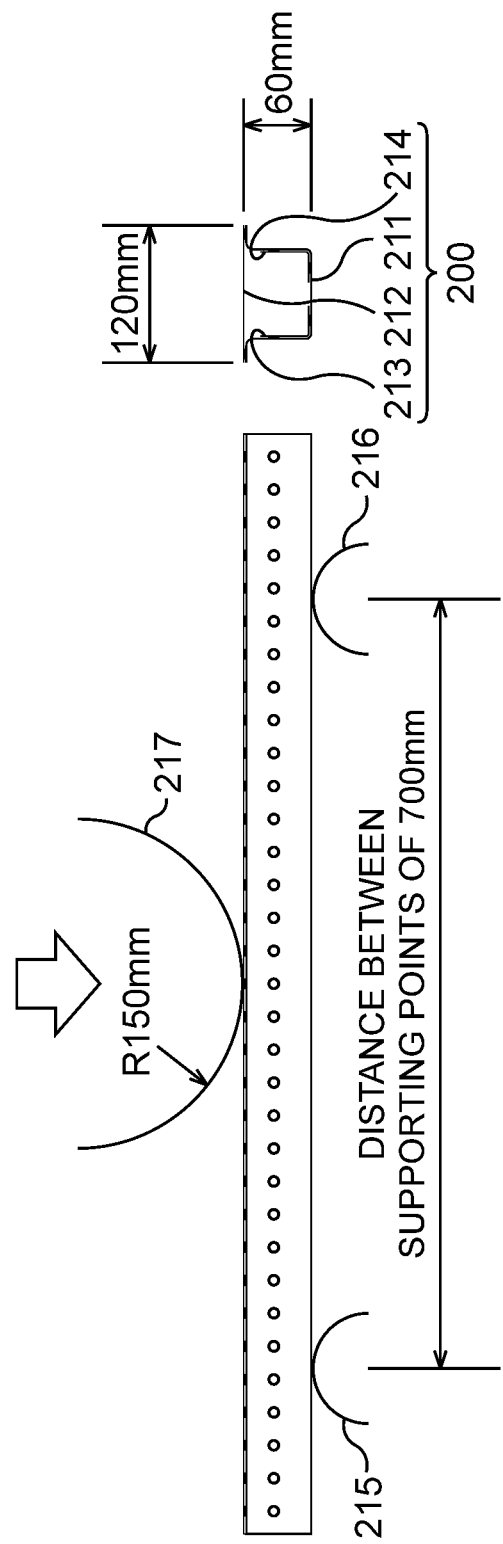
FIG. 18A is a schematic side view illustrating the hat-shaped member used in the example of the second embodiment and a status of a three-point bending test.
Figure 18B:
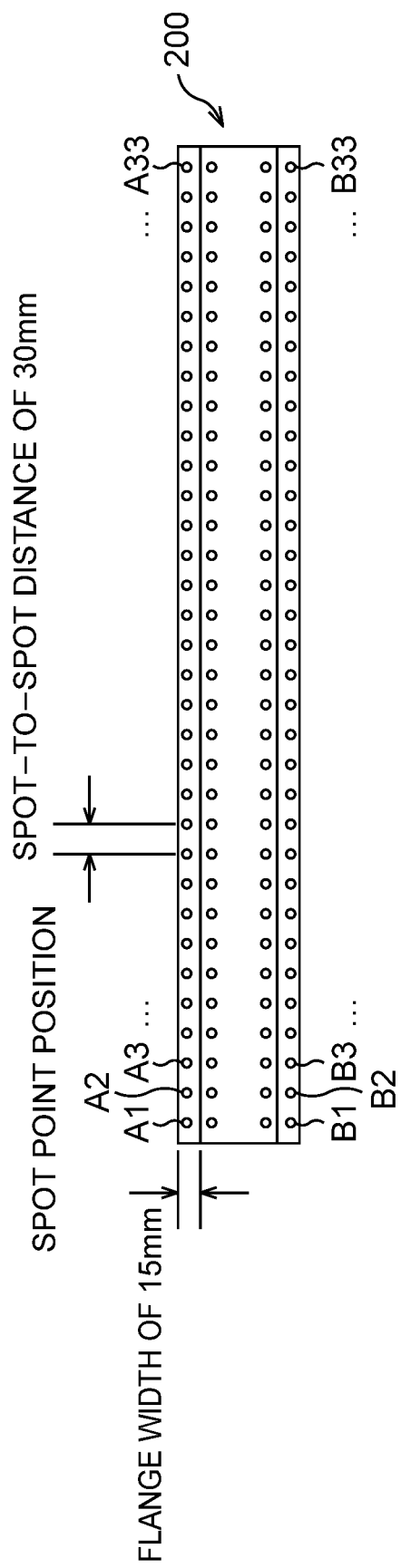
FIG. 18B is a schematic plan view illustrating the hat-shaped member used in the example of the second embodiment and the status of the three-point bending test.

In this example, as illustrated in FIG. 18A, FIG. 18B, a three-point bending test was performed using the hat-shaped member 200 having a height of 60 mm and a width of 120 mm. In the hat-shaped member 200, the base material 211 being a hat-shaped cross section steel sheet and the base material 212 being a planar steel sheet are joined together at 66 spot welded portions, and the base materials 213, 214 as reinforcing sheets are joined to the rear surface side of base material 211 each at 66 spot welded portions, the spot-to-spot distance is 30 mm and the flange width is 15 mm. As illustrated in FIG. 18B, positions of the spot welded portions joining the base materials 211, 212 in the hat-shaped member 200 are defined to be an A row (A1 to A33) and a B row (B1 to B33).

The material of the hat-shaped member 200 was a steel sheet having a tensile strength of 1500 MPa class, and all of the base materials 211 to 214 were formed into a sheet thickness of 1.6 mm. At this time, the nugget diameter of the spot welded portion was 6.3 mm. The three-point bending test was performed by pressing an impactor 217 having an R of 150 mm at a stroke of 60 mm from the base material 212 side with the hat-shaped member 200 supported by fixing jigs 215, 216 and the distance between supporting points of the fixing jigs 215, 216 set to 700 mm.

Further, an FEM model reproducing the experimental conditions was created, and a program according to the present invention was installed therein. The direction of the load applied to the spot welded portion was calculated sequentially every predetermined time interval, the effective width in the direction intersecting the load direction was calculated by the ellipse rule, fracture criteria were calculated using the effective width, and fracture prediction of the spot welded portion was performed.

In this example, as illustrated in FIG. 19, fracture prediction result by the FEM analysis was investigated for the "second embodiment", the "first embodiment, and the "prior art". In the "first embodiment", the effective width was acquired every predetermined time interval according to the change in load direction for the hat-shaped member 200 by the method in the above-described first embodiment. In the "second embodiment", appropriate first width and second width were set in consideration of the constitution surfaces and the base materials of the hat-shaped member 200 and the effective width was acquired by the method in the above-described second embodiment in addition to the method in the first embodiment. In the "prior art", the effective width was fixed to the spot interval without executing any of the methods in the first and second embodiments.

The table in FIG. 19 illustrates the results of summarizing the presence or absence of occurrence of fracture of each spot welded portion after the three-point bending test for the A row (A1 to A33) and the B row (B1 to B33) being the positions of the spot welded portions joining the base materials 211, 212 among the base materials 211 to 214. The presence or absence of occurrence of fracture of each spot welded portion was compared with the experimental result, and the percentage of the number of points for which the presence or absence of occurrence of fracture was able to be correctly predicted was obtained for all of 66 points.

The hitting ratio in the case of predicting the fracture by the "second embodiment" was 100%. The hitting ratio in the case of predicting the fracture by the "first embodiment" was 92.4%. The hitting ratio in the case of predicting the fracture by the "prior art" was 77.2%.

From the above results, it is found that the fracture prediction accuracy is low in the "prior art" for the hat-shaped member 200 including the base materials 211 to 214. In contrast to this, the fracture prediction accuracy is improved in the "first embodiment". However, since the constitution surfaces and the base materials 213, 214 are not taken into consideration in the "first embodiment", a wrong spot-to-spot distance is possibly acquired as the first width as described in FIG. 11A, FIG. 11B. As a concrete example, for example, as in FIG. 17A, FIG. 17B, the distance d1 should be the first width for calculating the effective width, but the distance d2 is acquired as the first width. In other words, in the "first embodiment", the first width and the second width regarding the spot welding portion for each of the constitution surfaces of the hat-shaped member 200 cannot be correctly acquired, so that there is a spot welded portion for which wrong fracture prediction is indicated. On the other hand, in the "second embodiment", the accuracy of fracture prediction was 100% and it was able to confirm that a stable fracture prediction accuracy was obtained regardless of the structure of the member being the object to be measured.

Third Embodiment

The functions of the above-described components (the first calculation unit 1 and the second calculation unit 2 and so on in FIG. 2) of the fracture prediction device according to the first embodiment and the functions of the above-described components (31 to 34 and so on in FIG. 15) of the condition acquisition device according to the second embodiment can be realized by running of a program stored in a RAM, ROM or the like of the computer. Similarly, the steps (Step S2 to S3 in FIG. 3, Steps S11 to S13 in FIG. 5 and so on) of the fracture prediction method according to the first embodiment and the steps (Step S21 to S24 in FIG. 16 and so on) of the condition acquisition method according to the second embodiment can be realized by running of the program stored in the RAM, ROM or the like of the computer. The program and a computer-readable recording medium having the program recorded thereon are included in the third embodiment.

Specifically, the above program is provided to the computer, for example, while recorded on a recording medium such as a CD-ROM or via various transmission media. As the recording medium recording the above program, a flexible disk, a hard disk, a magnetic tape, a magneto-optical disk, a nonvolatile memory card or the like other than the CD-ROM can be used. On the other hand, as the transmission medium for the above program, a communication medium in a computer network system for supplying program information by transmitting it as a carrier wave can be used. Here, the computer network is a LAN, a WAN such as the Internet, a wireless communication network or the like, and the communication medium is a wired line such as an optical fiber, a wireless line or the like.

Besides, the program included in this embodiment is not limited to the one which realizes the functions of the first or second embodiment by the computer executing the supplied program. For example, also when the program realizes the functions of the first or second embodiment in cooperation with an OS (operating system) with which the program is operating on the computer or other application software or the like, the program is also included in this embodiment. Further, also when the whole or a part of processing of the supplied program is executed by a function expansion board of the computer or a function expansion unit to realize the functions of the first or second embodiment, the program is included in this embodiment.

In this embodiment, in the case of predicting fracture of the spot welded portion in collision FEM analysis of the hat-shaped member joined by spot welding, the program of the present invention can be made to cooperate, for example, as a subroutine program for LS-DYNA being general-purpose collision analysis software. In short, LS-DYNA is used for deformation analysis of the member at collision, and the program of the present invention is used only for determination of fracture of the spot welded portion.

Figure 20:
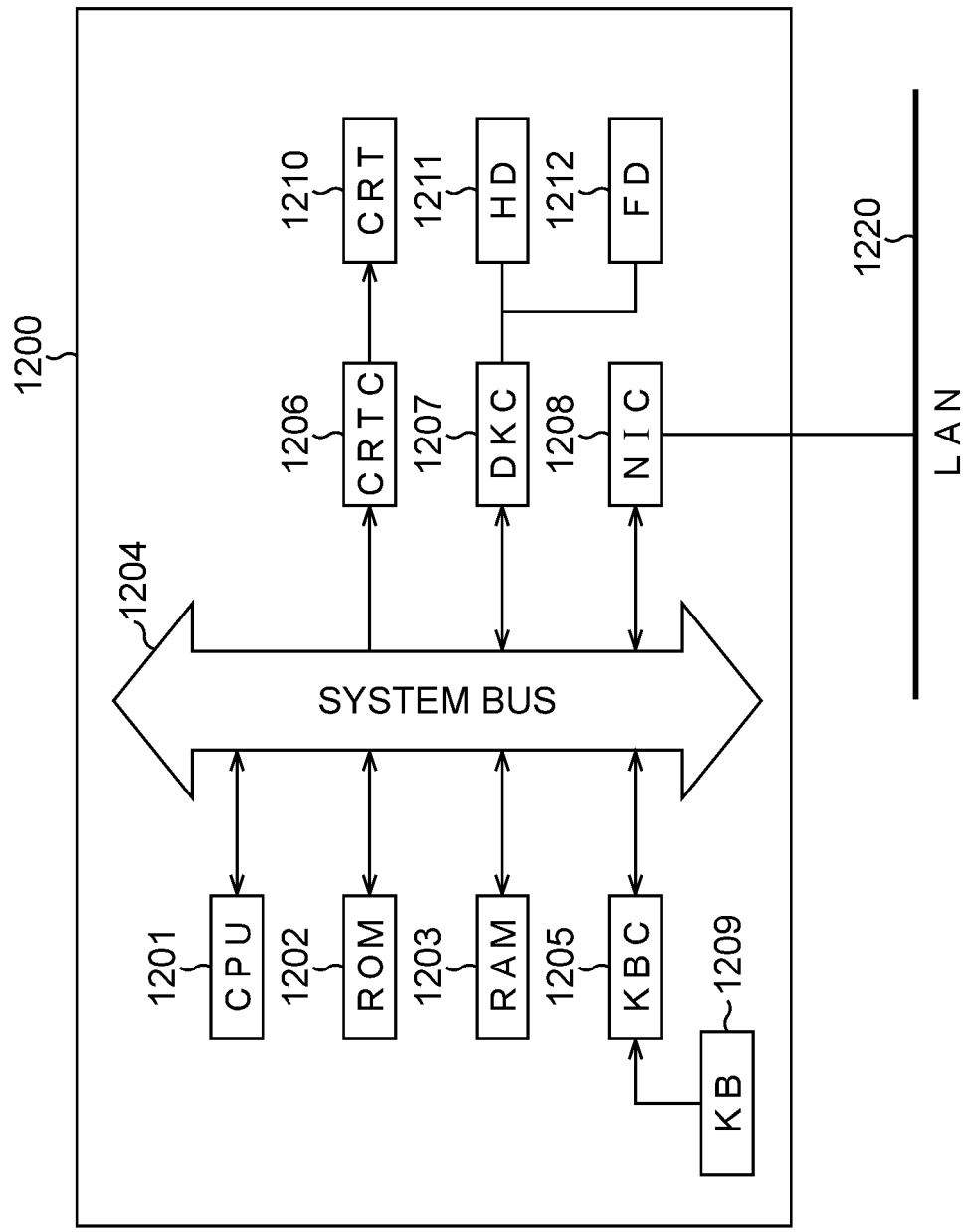
FIG. 20 is a schematic diagram illustrating an internal configuration of a personal user terminal device.

For example, FIG. 20 is a schematic diagram illustrating an internal configuration of a personal user terminal device. In FIG. 19, 1200 denotes a personal computer (PC) including a CPU 1201. The PC 1200 executes device control software stored in a ROM 1202 or a hard disk (HD) 1211 or supplied from a flexible disk drive (FD) 1212. The PC 1200 comprehensively controls devices connected to a system bus 1204.

The program stored in the CPU 1201, the ROM 1202 or the hard disk (HD) 1211 of the PC 1200 realizes the procedure of Steps S2 to S3 (Steps S11 to S13 in FIG. 5) in FIG. 3 in the first embodiment and the procedure of Steps S21 to S24 in FIG. 16 in the second embodiment.

1203 denotes a RAM and functions as a main memory, a work area and so on of the CPU 1201. 1205 denotes a keyboard controller (KBC) and controls an instruction input from a keyboard (KB) 1209, a not-illustrated device and so on.

1206 denotes a CRT controller (CRTC) and controls display of the CRT display (CRT) 1210. 1207 denotes a disk controller (DKC). The DKC 1207 controls access to the hard disk (HD) 1211 storing a boot program, a plurality of applications, an edit file, a user file, a network management program and so on, and to the flexible disk (FD) 1212. Here, the boot program is a startup program starting execution (operation) of hardware and software of the personal computer.

1208 denotes a network interface card (NIC) and performs bidirectional data exchange with a network printer, another network device, or another PC via the LAN 1220.

Note that instead of using the personal user terminal device, a predetermined calculator or the like specialized for the fracture prediction device may be used.

INDUSTRIAL APPLICABILITY

According to the present invention, for example, in the case of performing collision deformation prediction of an automobile member on a computer, fracture prediction of a spot welded portion where spot welding is modeled can be performed with high accuracy, thereby making it possible to omit a collision test using an actual automobile member or to significantly reduce the number of times of collision test. Further, the member design for preventing fracture at collision can be precisely performed on the computer, thus contributing to a significant cost reduction and reduction in developing period.

The invention claimed is:

1. A fracture prediction method of a spot welded portion of a member joined by spot welding in a case where a load is applied to the spot welded portion to lead to fracture, the fracture prediction method comprising:
    acquiring an effective width in a direction including the spot welded portion and intersecting a direction of the load on a flat surface where the spot welded portion of the member is provided;
    calculating, every predetermined time interval, the effective width changing correspondingly to a change in the load; and
    predicting fracture of the spot welded portion using the calculated effective width.

2. The fracture prediction method according to claim 1, wherein the effective width is calculated using a function of a spot-to-spot distance between adjacent spot welded portions and a width in a direction intersecting a direction of the spot-to-spot distance of the flat surface.

3. The fracture prediction method according to claim 1, wherein
the effective width is calculated by applying the load every predetermined time interval to the function created first.

4. The fracture prediction method according to claim 1, wherein
the load is projected onto the flat surface, and the effective width in a direction intersecting a direction of the projected load is calculated.

5. The fracture prediction method according to claim 1,
the member comprising a first base material and a second base material which are joined together by spot welding, the fracture prediction method further comprising,
for each of the first base material and the second base material:
acquiring an angular difference in a normal direction between adjacent shell elements;
classifying a surface of each of the first base material and the second base material into constitution surfaces, based on the angular difference;
classifying the spot welded portions belonging to the constitution surfaces into the classified constitution surfaces; and
acquiring a distance between the adjacent spot welded portions as a first width for each of the constitution surfaces.

6. The fracture prediction method according to claim 5, further comprising:
acquiring a width of the constitution surface in a direction intersecting the first width as a second width.

7. The fracture prediction method according to claim 5, wherein:
the member comprises a third base material joined with the first base material by spot welding; and
when the second base material or the third base material joined with the first base material by the spot welded portion focused on in the first base material and the second base material or the third the base material joined by the spot welded portion closest to the spot welded portion focused on are the same, the first width is acquired for the spot welded portion focused on.

8. A fracture prediction device of a spot welded portion of a member joined by spot welding in a case where a load is applied to the spot welded portion to lead to fracture, the fracture prediction device comprising:
a calculator that calculates, every predetermined time interval, an effective width in a direction including the spot welded portion and intersecting a direction of the load on a flat surface where the spot welded portion of the member is provided and changing correspondingly to a change in the load; and
a predictor that predicts fracture of the spot welded portion using the effective width.

9. The fracture prediction device according to claim 8, wherein
the calculator calculates the effective width using a function of a spot-to-spot distance between adjacent spot welded portions and a flat portion width in a direction intersecting a direction of the spot-to-spot distance.

10. The fracture prediction device according to claim 8, wherein the effective width is calculated by applying the load every predetermined time interval to the function created first.

11. The fracture prediction device according to claim 8, wherein
the calculator projects the load onto the flat surface, and calculates the effective width in a direction intersecting a direction of the projected load.

12. The fracture prediction device according to claim 8,
the member comprising a first base material and a second base material which are joined together by spot welding, the fracture prediction device further comprising,
for each of the first base material and the second base material:
an angular difference acquirer that acquires an angular difference in a normal direction between adjacent shell elements;
a constitution surface classifier that classifies a surface of each of the first base material and the second base material into constitution surfaces, based on the angular difference;
a welded portion classifier that classifies the spot welded portions belonging to the constitution surfaces into the classified constitution surfaces; and
a width acquirer that acquires a distance between the adjacent spot welded portions as a first width for each of the constitution surfaces.

13. The fracture prediction device according to claim 12, wherein
the width acquirer acquires a width of the constitution surface in a direction intersecting the first width as a second width.

14. The fracture prediction device according to claim 12, wherein:
the member comprises a third base material joined with the first base material by spot welding; and
when the second base material or the third base material joined with the first base material by the spot welded portion focused on in the first base material and the second base material or the third the base material joined by the spot welded portion closest to the spot welded portion focused on are the same, the width acquirer acquires the first width for the spot welded portion focused on.

15. A non-transitory computer readable recording medium storing a set of instructions executable by a processor to perform a method of predicting fracture of a spot welded portion of a member joined by spot welding in a case where a load is applied to the spot welded portion to lead to fracture, comprising:
calculating, every predetermined time interval, an effective width in a direction including the spot welded portion and intersecting a direction of the load on a flat surface where the spot welded portion of the member is provided and changing correspondingly to a change in the load; and
predicting fracture of the spot welded portion using the effective width.

16. The computer readable recording medium according to claim 15, wherein
the first process calculates the effective width using a function of a spot-to-spot distance between adjacent spot welded portions and a width in a direction intersecting a direction of the spot-to-spot distance of the flat surface.

17. The computer readable recording medium according to claim 15, wherein the first process calculates the effective width by applying the load every predetermined time interval to the function created first.

18. The computer readable recording medium according to claim 15, wherein
the first process projects the load onto the flat surface, and calculates the effective width in a direction intersecting a direction of the projected load.

19. The computer readable recording medium according to claim 15,
the member comprising a first base material and a second base material which are joined together by spot welding, the program product causing the computer to further execute,
for each of the first base material and the second base material:
a process of acquiring an angular difference in a normal direction between adjacent shell elements;
a process of classifying a surface of each of the first base material and the second base material into constitution surfaces, based on the angular difference;
a process of classifying the spot welded portions belonging to the constitution surfaces into the classified constitution surfaces; and
a process of acquiring a distance between the adjacent spot welded portions as a first width for each of the constitution surfaces.

20. The computer readable recording medium according to claim 19 causing the computer to further execute:
a process of acquiring a width of the constitution surface in a direction intersecting the first width as a second width.

21. The computer readable recording medium according to claim 19, wherein:
the member comprises a third base material joined with the first base material by spot welding; and
when the second base material or the third base material joined with the first base material by the spot welded portion focused on in the first base material and the second base material or the third the base material joined by the spot welded portion closest to the spot welded portion focused on are the same, the first width is acquired for the spot welded portion focused on.

* * * * *